United States Patent
Schimmel

[19]

[11] Patent Number: 6,115,790
[45] Date of Patent: Sep. 5, 2000

[54] SYSTEM, METHOD AND COMPUTER PROGRAM PRODUCT FOR ORGANIZING PAGE CACHES

[75] Inventor: Curt F. Schimmel, San Ramon, Calif.

[73] Assignee: Silicon Graphics, Inc., Mountain View, Calif.

[21] Appl. No.: 08/921,257

[22] Filed: Aug. 29, 1997

[51] Int. Cl.[7] .................................................. G06F 12/08
[52] U.S. Cl. ........................ 711/119; 711/148; 711/206
[58] Field of Search .................................. 711/119, 130, 711/148, 147, 206, 210

[56] References Cited

U.S. PATENT DOCUMENTS

| | | | |
|---|---|---|---|
| 5,119,290 | 6/1992 | Loo et al. ................................. | 711/210 |
| 5,321,836 | 6/1994 | Crawford et al. ....................... | 711/206 |
| 5,592,625 | 1/1997 | Sandberg ................................. | 711/147 |

OTHER PUBLICATIONS

Hennessy and Patterson, *Computer Architecture: A Quantitative Approach*, 2nd Ed., pp. ix–xii, 439–457 and 634–760, Morgan and Kaufman Publishing, USA 1996.

Goodheart, B. and James Cox, *The Magic Garden Explained*, Prentice Hall, 1994, pp. ix–xix and 69–140.

Schimmel, *UNIX System for Modern Architectures: Symmetric Multiprocessing and Caching for Kernel Programmers*, Addison–Wesley Professional Computing Series, 1994, pp. vii–xiv and 5–8.

*Primary Examiner*—John W. Cabeca
*Assistant Examiner*—Christopher S. Chow
*Attorney, Agent, or Firm*—Sterne, Kessler, Goldstein & Fox P.L.L.C.

[57] ABSTRACT

A system, method and computer program product for distributing page caches among memory objects and, in a DSM system, among memories in the DSM system. The system, method and computer program product provides a separate page cache for each memory object. Each separate page cache associates page frame data structures that represent pages of memory that store a portion of an associated memory object. A separate mutual exclusion mechanism is provided for each page cache for protecting the integrity of the page caches during page cache operations. Page cache operations, such as adding and deleting page frame data structures, checking and updating state information in page frame data objects, and identifying page frame data objects that correspond to particular memory objects or memory object logical offsets, can be performed for different memory objects in parallel.

45 Claims, 15 Drawing Sheets

TO MAIN MEMORY (112, 220, 328-342)

SYSTEM, METHOD AND COMPUTER PROGRAM PRODUCT FOR ORGANIZING PAGE CACHES

BACKGROUND OF THE INVENTION

1. Field of the Invention

The present invention relates to software-based, distributed caching of memory object pages.

2. Related Art

Conventional computer systems include uni-processor computer systems, shared memory, symmetric multi-processing (SMP) systems and multi-processor, non-uniform memory access (NUMA) system. NUMA systems include distributed shared memory (DSM) multi-processor systems. SMP systems are also known as uniform memory access systems. Uni-processor systems and SNP systems generally employ a single main memory. In SMP systems, the single memory is shared by the multiple processors. In DSMs main memory is physically distributed among a plurality of processing nodes so that each node has some portion of main memory physically located adjacent to, or within, the processing node.

Conventional computer operating systems typically divide main memory into pages of physical memory. Conventional computer operating systems also typically generate a separate page frame data structure (PFDAT) to represent each page of physical memory. Each page frame data structures stores identification and state information for the page of memory that is represented.

Conventional operating systems generate data structures to represent memory objects. Memory objects are objects that can be mapped into an address space. Memory objects can include regular files as well as anonymous memory objects such as, for example, stacks, heaps, UNIX system V shared memory and /dev/zero mappings. A memory object can be backed by a disk file and, hence, can be larger than physical memory. The operating system manages which portion of the memory object occupies memory at any given time.

Computer operating systems need to know which portion of a memory object is contained in a particular page of memory. Thus, when a page of a memory object is stored in a page of physical or main memory, the PFDAT that is associated with the page of physical memory stores a memory object identification and logical offset. The memory object identification can be a pointer to the data structure that represents the memory object The logical offset identifies a portion of the memory object that is stored, relative to the beginning of the memory object. This information is used by the operating system to identify which PFDATs are associated with which memory objects and vice versa.

Operating systems can check or update state information in PFDATs. Operating systems can also search PFDATs for memory object identifications and logical offsets to determine, for example, whether a given page of a memory object is in memory. When a user directs the operating system to delete a memory object, for example, any pages in memory that are associated with the memory object must be found and de-allocated. Thus, a search is performed to find all PFDATs that have a pointer to the memory object. Similarly, if an operation is directed to a specific page of a memory object, a search is performed on PFDATs to determine which, if any, include the corresponding logical offset In order to permit searching of PFDATs, conventional operating systems organize PFDATs into a global structure, generally called a page cache or global page cache. Global page caches can be implemented through any of a variety of techniques such as, for example, a linked list of PFDATs, a hash table of PFDATs, a tree structure of PFDATs, etc. The operating system can perform a variety of page cache operations on the global page cache. For example, when an action is to be performed on a page of a memory object, the global page cache is searched to determine whether any PFDATs correspond to the particular page of the memory object.

In multi-processor systems, some method of mutual exclusion is provided for controlling access to the global page cache. One such mechanism is a global lock. Many other suitable mechanisms are known to those skilled in the art and the exact method employed does not affect the present invention.

As a result of the mutual exclusion mechanism, however, each process which needs to perform a global page cache operation must wait until the global page cache is free or unlocked. Moreover, as the size of main memory grows, the number of PFDATs which must be searched increases. Thus, as the number of PFDATs increases, the length of time that processors spend waiting for searches to complete also increases. Increased latency of page cache operations limit the scalability of multi-processor systems.

In DSMs, there are additional drawbacks to global page caching. For example, the global page cache is stored in a portion of physical memory on one of the processing nodes of the DSM system. When a distant processor needs to perform a page cache operation, access must first be made to the node that stores the global page cache. This increases latency of page cache operations.

Global page caches in DSMs also cause hot spots to occur at the processing node that stores the global page cache. These hot spots are due to the frequency of accesses by many different processes. Thus, latency of page cache operations increase due to contention on limited bandwidth interfaces. As more processors are added, contention and, therefore, memory latency increases. Global page caching and global mutual exclusion mechanisms, thus, limit the number of processors and processes which can be effectively handled by conventional DSMs. Conventional global page caching techniques and global mutual exclusion mechanisms thus limit scalability.

What is needed is a system, method and computer program product for reducing memory access latency that results from global page cache operations and for reducing contention caused by global mutual exclusion mechanisms.

SUMMARY OF THE INVENTION

The present invention provides a system, method and computer program product for distributing page caches among memory objects and, in a DSM system, among memories in the DSM system. The present invention generates a separate page cache for each memory object Each separate page cache contains page frame data structures that represent pages of memory that store a portion of an associated memory object. Separate page caches can be implemented in a variety of ways, such as, for example, linked lists, hash tables and tree structures.

The present invention also provides a separate memory mutual exclusion mechanism for each page cache for locking the page cache during page cache operations. Global mutual exclusion mechanisms are eliminated so that multiple page cache searches can be performed in parallel.

In one embodiment of the present invention, separate page caches are distributed throughout a distributed shared memory (DSM) system, so that each page cache is proximate to an associated memory object data structure.

In another embodiment of the present invention, separate page caches are distributed throughout a distributed shared memory (DSM) system, so that each page cache is proximate to a processor that is a primary requestor for page cache operations on the page cache.

By distributing page caches in DSMs when there is available memory, page cache operations require fewer accesses to remote nodes. This reduces contention for communication lines and reduces hot spots, thereby reducing overall memory access latency.

In another embodiment of the present invention, when a page of memory is migrated from a first page frame to a second page frame, a first page frame data structure that represents the first page frame is deleted from a page cache. In addition, a second page frame data object that represents the second page frame is added to the page cache.

One advantage of the present invention is that, since each memory object has a separate page cache, and since each page cache has its own locking mechanism, page caches can be searched in parallel. As a result, systems that employ the present invention scale better than they would if they employed a global page cache.

For example, when a page cache operation is performed to determine a physical address of a page of data that belongs to a memory object, only the page cache that is associated with the memory object is searched. The search does not involve page frame data structures that are unrelated to the memory object. Thus, translations for different memory objects can be performed in parallel. As a result, page cache contention is substantially reduced. In fact, unless there is another process that is performing a page cache operation on the same page cache, there is no contention. Moreover, because a single global page cache is replaced by many smaller page caches, the time to search a selected page cache is substantially reduced. As a result, search time is now proportional to the number of pages that are cached for a memory object, not on the size of physical memory.

Another advantage of the present invention is that, since PFDATs that represent memory that does not store portions of a memory object are not cached in a page cache for the memory object, those PFDATs are not searched during a page cache operation for the memory object. In addition, the page cache tends to be smaller than it otherwise would be if the PFDATs for pages from different memory objects were intermingled in one cache. Separate page caches thus make operations more efficient.

Further features and advantages of the present invention, as well as the structure and operation of various embodiments of the present invention, are described in detail below with reference to the accompanying drawings.

BRIEF DESCRIPTION OF THE FIGURES

The present invention will be described with reference to the accompanying figures, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

Table of Contents

Figure 1:
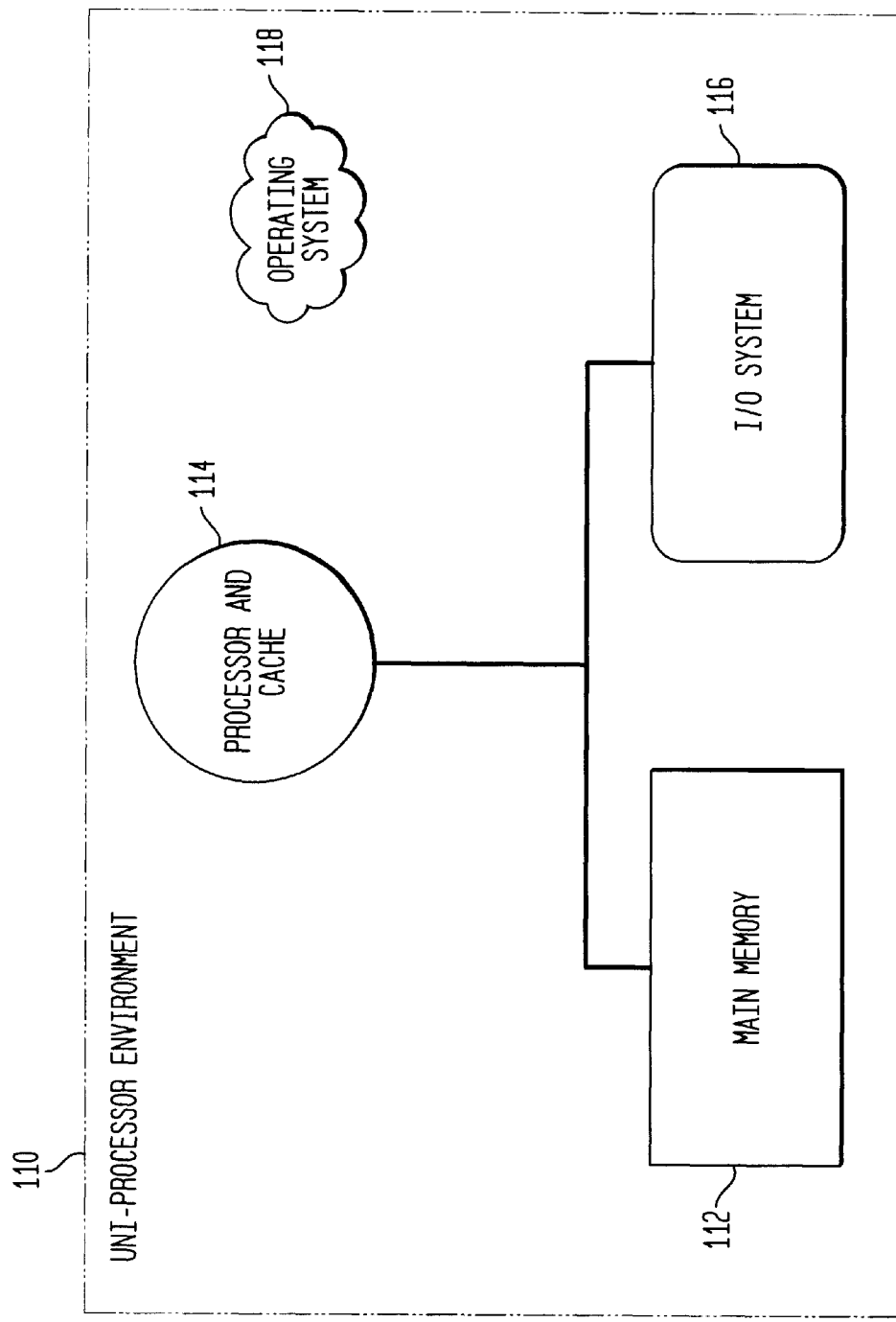
FIG. 1 is a block diagram of a uni-processor system that can employ the present invention.

1. Overview and Terminology
2. Example Environment
   A. Data Structures Used for Representing Memory and Memory Objects
   B. Free-List Data Structures
   C. Mutual Exclusion Mechanisms
   D. Global Page Caches do not Scale
   E. Global Memory Locks in DSMs
3. Distributed Page Caching
4. Conclusions 1. Overview and Terminology The present invention provides a system, method and computer program product for generating a separate page cache of page frame data structures (PFDATs) for each memory object. Each page cache is provided with a mutual exclusion mechanism for protecting the page cache during page cache operations. The present invention is highly scalable.

By providing a separate page cache for each memory object, only the page cache that is associated with a memory object is locked during a page cache operation for the memory object. PFDATs that are not associated with the given memory object are not cached in a page cache for the memory object. As a result, PFDATs that represent pages of memory that do not store portions of the memory object are not locked during page cache operations associated with the memory object.

Page cache operations can be performed on different page caches in parallel because each memory object has a separate page cache and each page cache has its own locking mechanism. As a result, systems that employ the present invention scale better than they would if they employed a global page cache. In addition, the page cache tends to be smaller than it otherwise would be if the PFDATs for pages from different memory objects were intermingled in one cache. Separate page caches thus make operations more efficient.

Throughout this specification reference is made to pages of physical memory. Wherever a page of physical memory is referred to, it is to be understood that any unit of physical memory is intended, including, but not limited to, page, segment, block and individual memory cells.

Conventional operating systems generate data structures to represent pages of physical memory. Each data structure stores identification and state information for the page of memory that it represents. These data structures can be implemented in a variety of ways and referred to by a variety of names. For example, in Silicon Graphics' IRIX operating system, these data structures are referred to as page frame data structures, or PFDATs.

Throughout the remainder of this specification, the terms page frame data structure and PFDAT are used interchangeably to refer to data structures that represent pages of physical memory. Whenever the terms page frame data structure or PFDAT is used, it is to be understood that they are used in a broad sense to refer to any data structure that represents pages of physical memory.

Conventional operating systems generate data structures to represent memory objects and to store state information for memory objects. These memory objects can include regular files as well as anonymous memory objects such as, for example, stacks, heaps, UNIX System V shared memory and /dev/zero mappings. A memory object can be backed by a disk file and, hence, can be larger than physical memory. The operating system manages which portion of the memory object occupies memory at any given time.

Data structures that represent memory objects can be implemented in a variety of ways and referred to by a variety of names. In Silicon Graphics' IRIX operating system, for example, regular files are represented by VNODE data structures. Throughout the remainder of this specification, the term memory object data structure is used to refer to data structures that represent memory objects. Wherever the term memory object data structure is used, it is used in a broad sense to refer to any data structure that represents a memory object 2. Example Environment The present invention can be implemented in a variety of computer systems and environments, including, but not limited to, uni-processor computer systems, shared memory, symmetric multi-processing (SMP) systems and distributed shared memory (DSM) multi-processor systems. The present invention can be implemented in software, firmware or hardware, or any combination thereof. For example, the present invention can be implemented as software in an IRIX™ or Cellular IRIX™ operating system executed by an Origin™ scalable, distributed shared-memory multi-processor platform, manufactured by Silicon Graphics, Inc., Mountain View, Calif. A brief description of uni-processor systems, SMP systems, and DSM systems is provided below. These examples are provided to assist in the description of distributing page caches, not to limit the present invention.

Referring to FIG. 1, a uni-processor system 110 includes a single processor and cache node 114 coupled to a main memory 112. Main memory 112 stores data for use by processor and cache node 114. An input and output I/O system 116 provides interfacing to peripheral devices, such as, for example, user interfaces and memory devices. System 110 can be controlled by an operating system 118.

Figure 4:
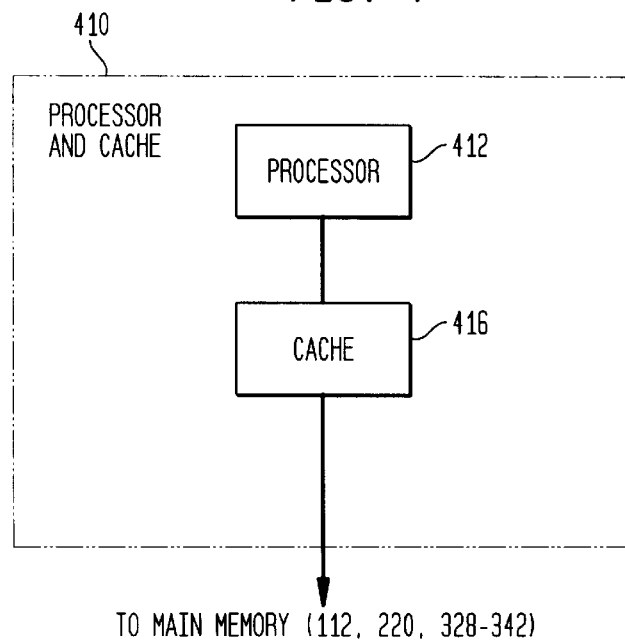
FIG. 4 is a block diagram of a processor and cache node that can be employed by any of the processor systems illustrated in FIGS. 1–3.

Referring to FIG. 4, processor and cache node 114 can be implemented as processor and cache node 410. Processor and cache node 410 includes a processor 412 coupled to a main memory, which can be main memory 112, via a cache 416. For clarity, only a single processor 412 and cache memory 416 are shown. One skilled in the art will recognize that multiple processors and multiple levels of cache can be employed.

Cache 416 is provided for caching data retrieved from a main memory such as main memory 112. Once data is cached in cache 416, processor 412 can retrieve data from cache 416. Processor 412 can generally retrieve data from cache 416 faster than it can access data in main memory 112 because of the proximity of cache 416 to processor 412 and because the memory parts that are used to make cache 416 are faster than the memory parts that are used to make main memory. Cache 416 can include one or more levels of cache, as dictated by needs of users.

In operation, processor 412 processes threads for one or more processes. When processor 412 needs to access data stored in main memory 112, an access request is sent. If processor 412 is permitted access to the requested data, main memory 112 returns the requested data to cache 416. Once the requested data is stored in cache 416, processor 412 can access the data as necessary. In the future, processor 412 can access data in cache 416 without accessing main memory 112.

Figure 2:
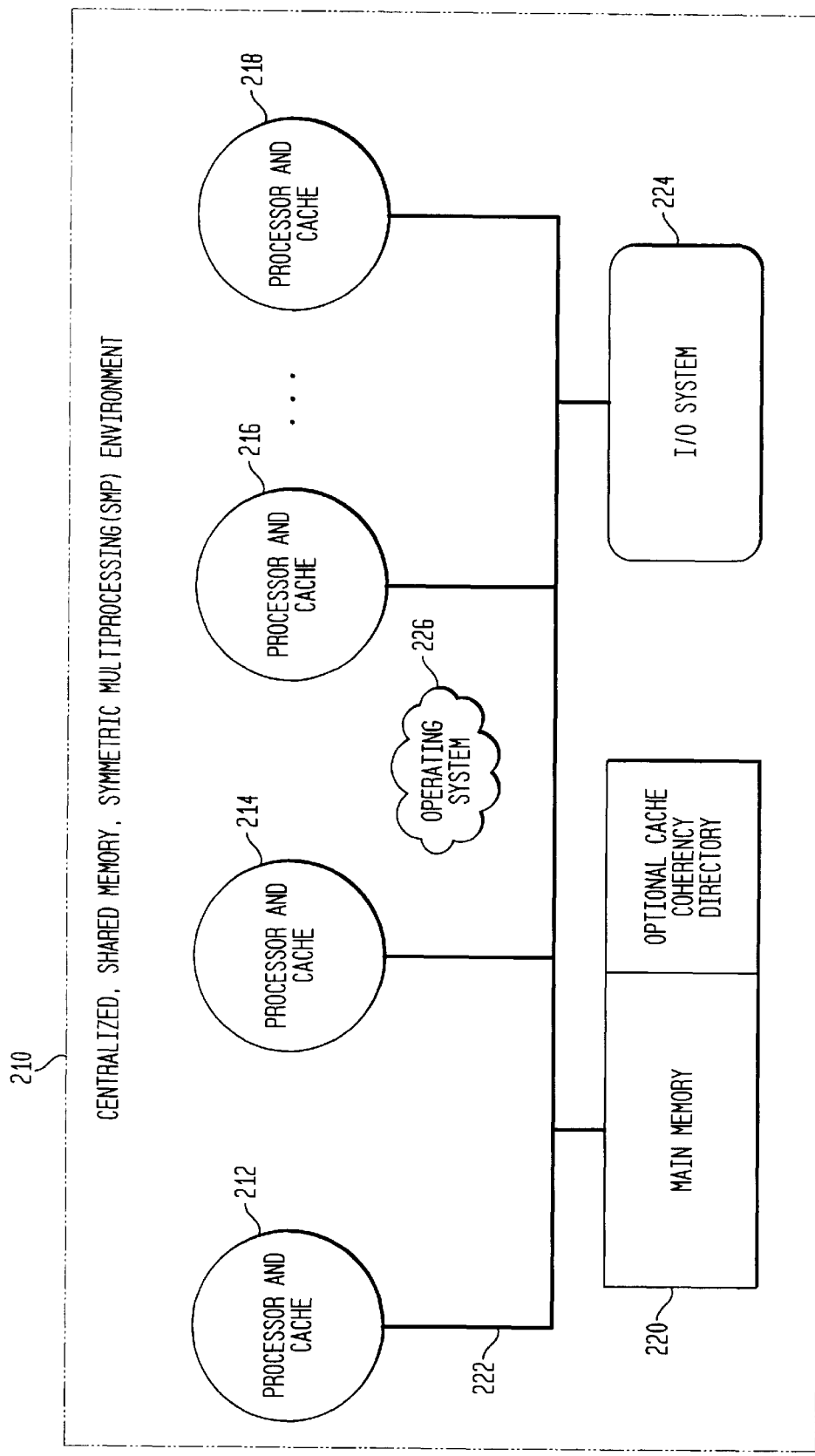
FIG. 2 is a block diagram of a symmetric, shared memory, multiple processor (SMP) system that can employ the present invention.

Referring to FIG. 2, a centralized, shared memory, symmetric multi-processing (SMP) system 210 includes a plurality of processor and cache nodes 212–218 operating under control of an operating system 226. SMP system 210 can include any number of nodes 212–218.

Processor and cache nodes 212–218 are coupled to a centralized, shared, main memory 220 via a bus 222. An I/O system 224 can be provided for interfacing SMP system 210 with various external and peripheral devices.

Processor and cache nodes 212–218 can be implemented, for example, as processor and cache node 410, in FIG. 4, described above. Alternatively, one or more processor and cache nodes 212–218 can employ a plurality of processors 412 and caches 416. In either implementation, SMP system 210 permits multiple processors 412 to process a plurality of tasks in parallel. Centralized, shared memory 220 permits multiple processors 412 to share data between tasks.

Figure 3:
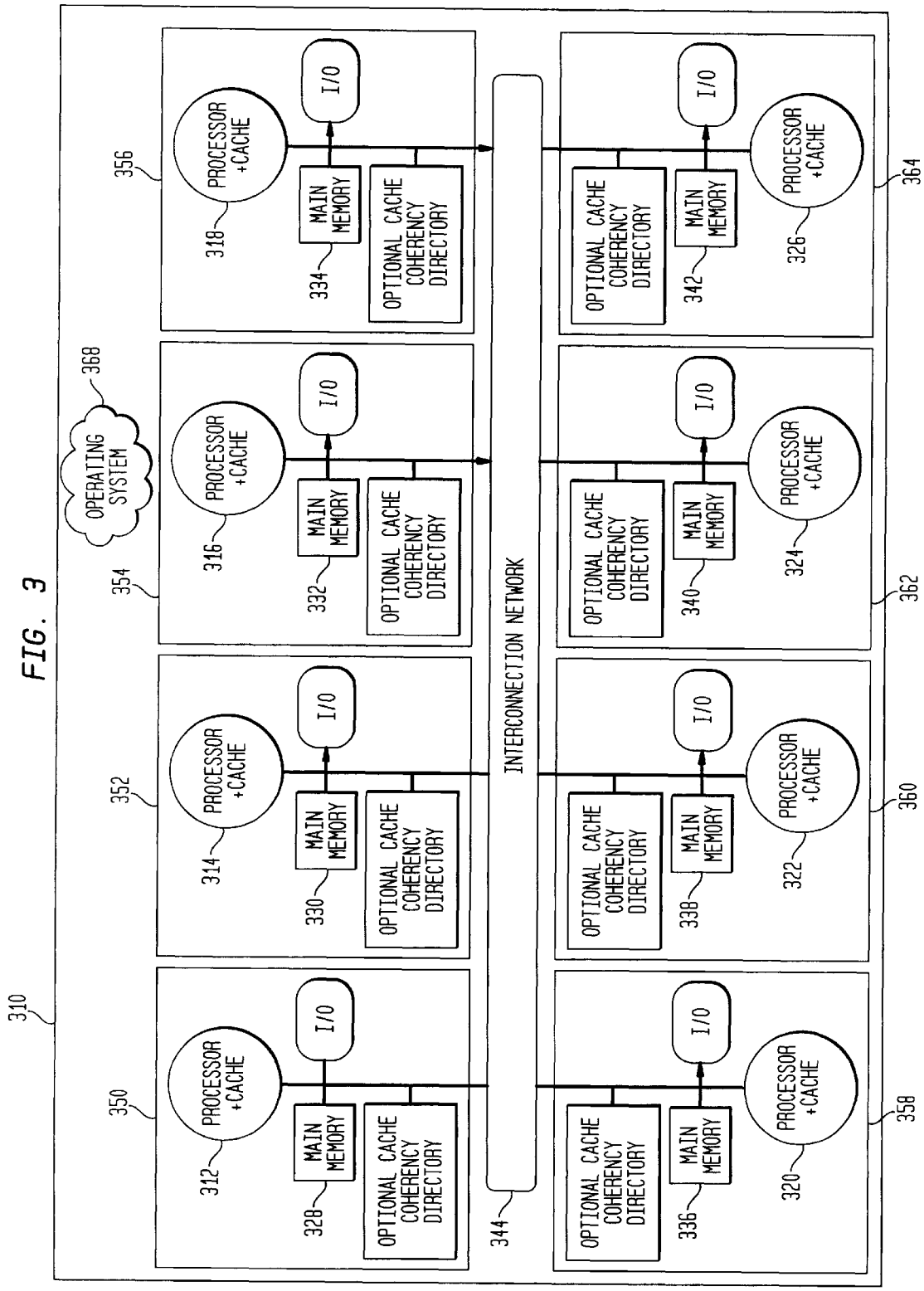
FIG. 3 is a block diagram of a distributed, shared memory, multiple processor (DSM) system which can employ the present invention.

Referring to FIG. 3, a distributed shared memory (DSM) system 310 includes a number of processing nodes 350–364, interconnected via an interconnection network 344 operating under control of an operating system 368. DSM 310 can include any number of processing nodes 350–364. Each processing node 350–364 is illustrated with a processor and cache node 312–326 and a portion of distributed shared memory 328–342. As would be apparent to a person skilled in the art, one or more of processing nodes 350–364 need not employ a processor and cache node.

Processor and cache nodes 312–326 can be implemented, for example, as processor and cache node 410, in FIG. 4, where each processor 412 accesses a portion of shared memory 328–342 through one or more levels of cache 416. Alternatively, one or more processor and cache nodes 312–326 can have a plurality of processors 412 and caches 416.

Distributed shared memory portions 328–342 are accessed by the processors within processing nodes 350–364 as if shared memory portions 328–342 formed a single continuous block of physical memory. As would be apparent to a person skilled in the art, one or more of processing nodes 350–364 need not employ a portion of shared memory.

In the example of FIG. 3, each processing node 350–364 is shown with an optional input/output (I/O) device. As would be apparent to a person skilled in the art, one or more of processing nodes 350–364 need not have an I/O device. Moreover, different types of I/O devices and combinations of external peripherals and resources can be used in a DSM system. Thus, one or more of processing nodes 350–364 can include any combination of processors or no processors, shared memory or no shared memory and I/O or no I/O.

In the example of FIG. 3, each processing node 350–364 is shown with an optional cache coherency directory. However, the present invention is not limited to directory-based cache coherency protocols. As would be apparent to one skilled in the art, a snooping protocol or any other hardware-based protocol or software-based cache coherency scheme can be employed.

By distributing physical or main memory 328–342 throughout DSM 310, each processing node 350–364 can include a portion of main memory. This physical proximity between processor and memory reduces memory latency with respect to the processor and memory within a processing node. DSM 310 is preferably configured so that data which is accessed most frequently by a particular processing node is placed in the portion of main memory within the processing node. If that data is subsequently accessed more frequently by a processor in another processing node, the data is migrated, or moved, to a portion of main memory within the other processing node.

Uni-processor systems, SMP systems and DSM systems, such as systems 110, 210 and 310 described with reference to FIGS. 1–3, are well known. Further details of such systems can be found in, for example, Hennessy and Patterson, *Computer Architecture A Quantitative Approach*, 2d Ed. (Morgan and Kaufmann Publ.: USA 1996), incorporated herein by reference.

A. Data Structures Used for Representing Memory and Memory Objects

Figure 5:
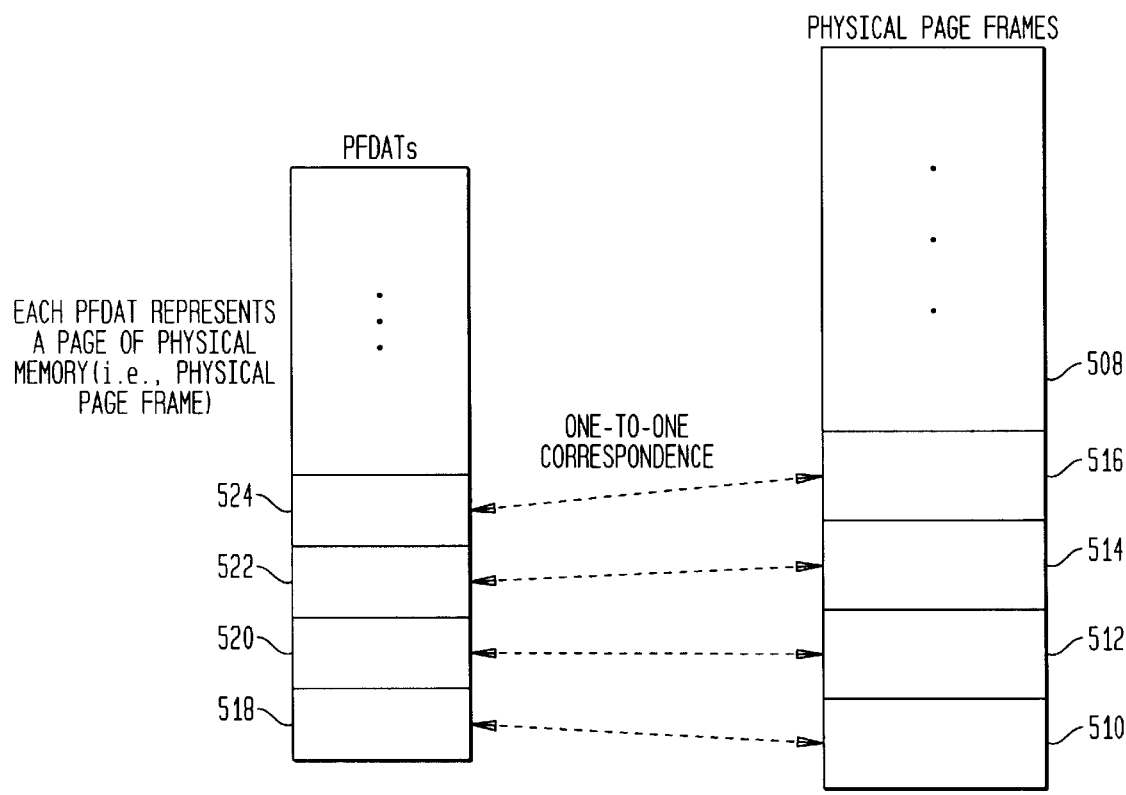
FIG. 5 is a block diagram of pages of physical memory and page frame data structures that can be used to represent pages of physical memory.

Conventional computer systems typically divide main memory, such as main memories 112, 220 and 328–342, into pages of physical memory in order to simplify hardware and the operating system. For example, referring to FIG. 5, a physical memory 508, which can be any of physical memories 112, 220, 328342, is divided into a number of physical page frames, or pages, 510–516.

Each physical page frame 510–516 is represented by a PFDAT 518–524, respectively. The operating system uses PFDATs 518–524 to store state information related to the associated page frames 510–516 and to locate pages of memory objects that are stored in page frame 510–516.

Preferably, the address of the physical page that a PFDAT represents is stored implicitly, by noting the relative position of the PFDAT in memory. From the relative position of the PFDAT, the physical page address can be computed. This method of identifying a physical page address is generally preferred because it saves storage overhead by not storing a pointer.

Alternatively, PFDATs 518–524 can each store a pointer to a page of physical memory that the PFDAT represents. For example, referring to FIG. 6, PFDAT 518 can include a pointer 610 that points to associated page 510 of physical memory. As would be apparent to a person skilled in the art, other methods of identifying physical page addresses from PFDATs can be employed.

When a page of physical memory stores a page of a memory object, the associated PFDAT includes a reference to the memory object Preferably, the reference includes a memory object identification and a logical offset within the memory object. The memory object identification can be a pointer to a data structure that represents the memory object. The logical offset identifies a portion of the memory object that is stored, relative to the beginning of the memory object.

Figure 6:
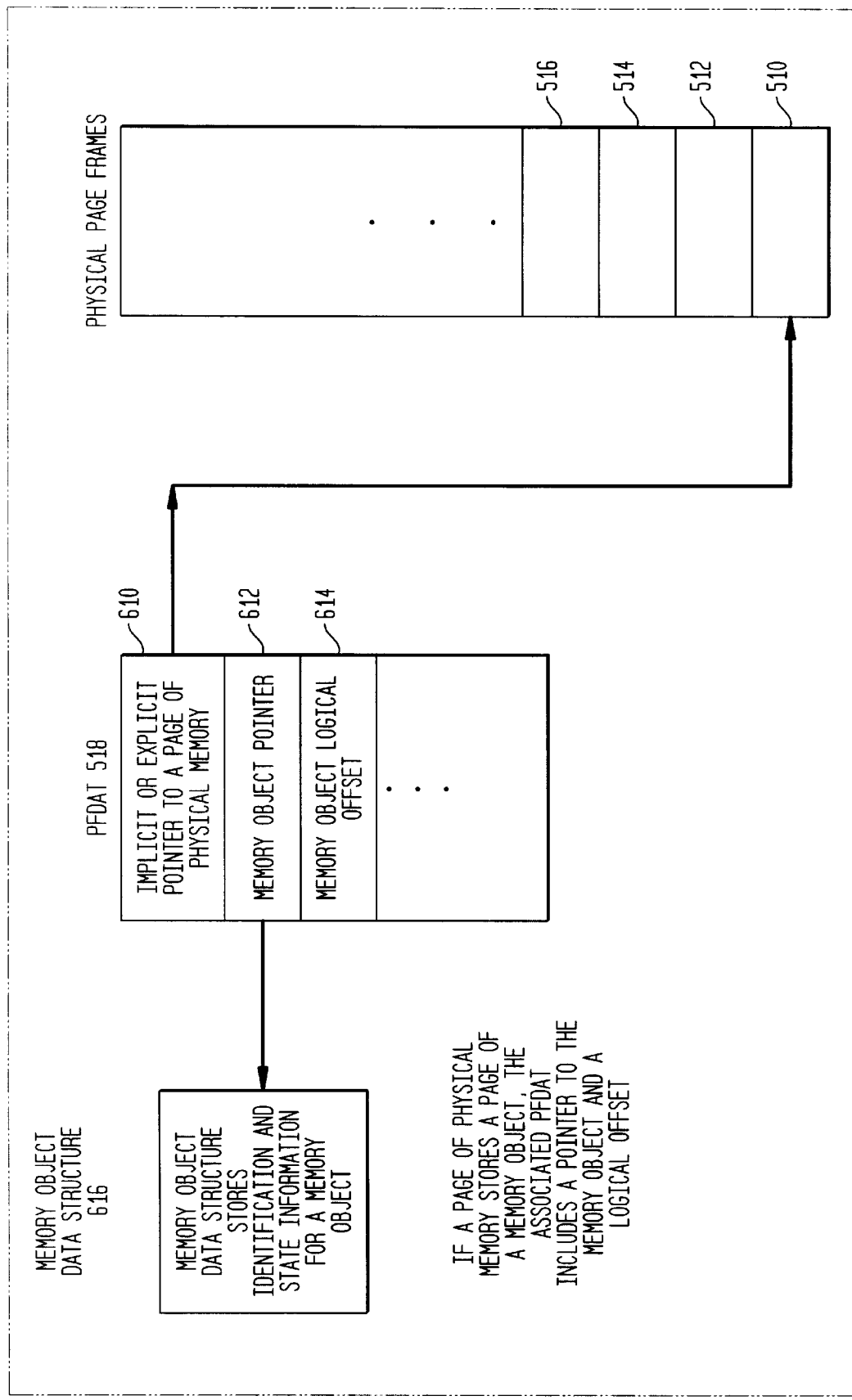
FIG. 6 is a block diagram illustrating a relationship between a page of memory, a page frame data structure and a memory object data structure.

For example, referring to FIG. 6, when page frame 510 stores a page of a memory object, PFDAT 518 stores a pointer 612 that points to memory object data structure 616. PFDAT 518 also stores a logical offset 614 which indicates the portion of the memory object that is stored in page frame 510.

Computer operating systems employ PFDATs, such as PFDATs 518–524, to store state information for pages of memory, such as, for example, whether data stored within the associated page of physical memory is clean or dirty, the current number of users of the data stored in the associated page of memory, etc.

Computer operating systems also employ PFDATs, such as PFDATs 518–524, to determine whether, and where, pages of memory objects are stored in physical memory by searching PFDATs for memory object identifications and logical offsets. For example, when a user directs the operating system to delete a memory object, any pages in memory that are associated with the memory object must be found and de-allocated. The operating system searches PFDATs to determine whether any of them store a pointer to the memory object As another example, when the operating system needs to locate a page of a memory object, the operating system searches the PFDATs for the logical offset of the page. The search identifies a PFDAT if the PFDAT stores the logical offset that is being searched for. From the PFDAT, the physical address of the page can be determined. PFDATs can be inserted and deleted from the page cache as needed.

In order to facilitate efficient operations on PFDATs, including checking and updating state information and searching or translation of memory object identification and logical offsets into the corresponding PFDAT, PFDATs that are associated with memory objects are organized into a data structure, typically called a page cache. A page cache maps between logical offsets of memory objects and physical pages of main memory. Given a memory object identification and logical offset, a page cache mapping and searching function can identify a page of physical memory which contains the data.

A page cache is generated by organizing PFDATs that are associated with memory objects (i.e., PFDATs that represent memory that stores portions of memory objects) into a searchable data structure. PFDATs can be organized in a variety of fashions, including linked lists, hash tables, tree structures, etc. Where a physical memory is large, however, linked lists are often impractical since searching a linked list of large numbers of PFDATs can take an excessive amount of time.

Figure 7:
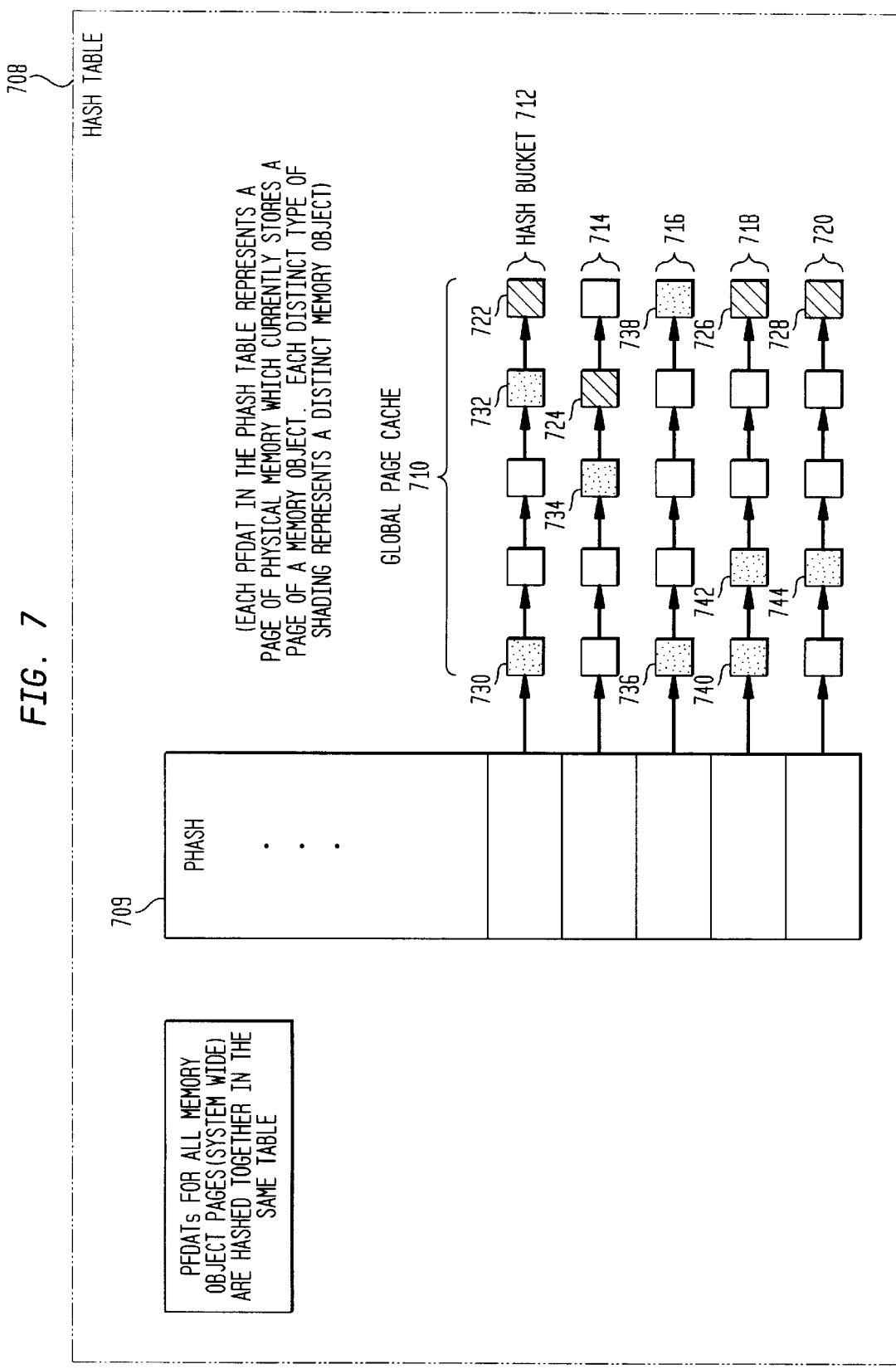
FIG. 7 is a block diagram of a hash table that can be used to maintain a conventional global page cache of page frame data structures.

A preferred method for generating and searching PFDATs is with a hash table. Referring to FIG. 7, a hash table 708 is employed for organizing PFDATs such as, for example, PFDATs 518–524. Hash tables, such as hash table 708, employ hashing functions to organize and identify pages of physical memory that store portions of memory objects, based on memory object identifications and logical offsets.

PFDATs 710 represent pages of a physical memory which store pages of memory objects. Each separate pattern shown in PFDATs 710 represents a different memory object. For example, PFDATs 722, 724, 726 and 728, all shown with a diagonal line pattern, belong to a first memory object. Similarly, PFDATs 730–744, all shown as dotted black, represent pages of a second memory object. The remaining uncolored PFDATs can represent pages of a one or more additional memory objects.

Hash table 708 hashes PFDATs 710 into a number of hash buckets 712–720 with PHASH data structure 709. Hash tables and hashing functions are well known. Any of a variety of types of hash tables and hashing functions can be employed.

There are times, however, when the range of logical offsets that are being searched for, or when the number of PFDATs that are being searched, is so large that a linear search is preferred over hash tables. For example, suppose a large memory object is to be deleted from the page cache. Although the memory object is large, there might be few or no pages of the memory object stored in physical memory. However, in order to determine whether any pages of the memory object are stored in physical memory, the fill range of logical offsets of the memory object must be looked for within the page cache. For memory objects that are larger than physical memory, a search for the affected range of logical offsets in a page cache is more efficiently performed with a linear search, rather than by hashing.

B. Free-List Data Structures

Figure 8:
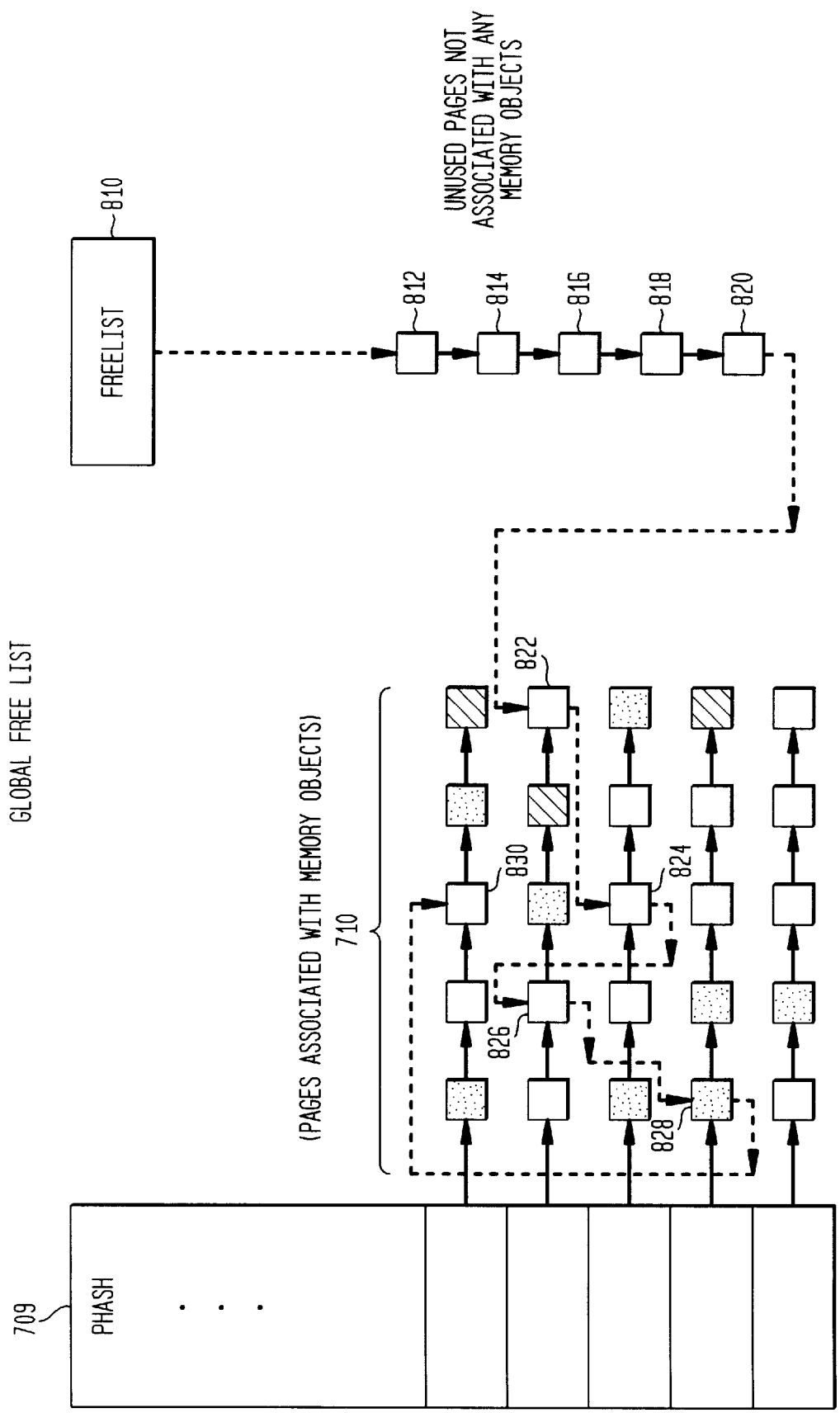
FIG. 8 is a block diagram of a free list data structure that can be used to identify page frame data structures for free pages.

Operating systems generate free-list data structures for identifying pages of available physical memory. Referring to FIG. 8, a free list data structure 810 associates PFDATs 812–820 which represent pages of free or unused physical memory. Free list data structure 810 can also associate a number of PFDATs which currently store data which can be overwritten if necessary. For example, free data structure 810 can associate PFDATs 822–830 which currently store data associated with memory objects but which are not presently in use and, thus, can be available for being overwritten with new data.

C. Mutual Exclusion Mechanisms

During a page cache operation, the operating system protects the integrity of a page cache data structure with some form of mutual exclusion. Mutual exclusion can include locking mechanisms and lock-less mechanisms. Locking mechanisms can include a global locking mechanism for locking a whole page cache data structure and/or multiple locks for locking different portions of the page cache data structure.

Figure 9:
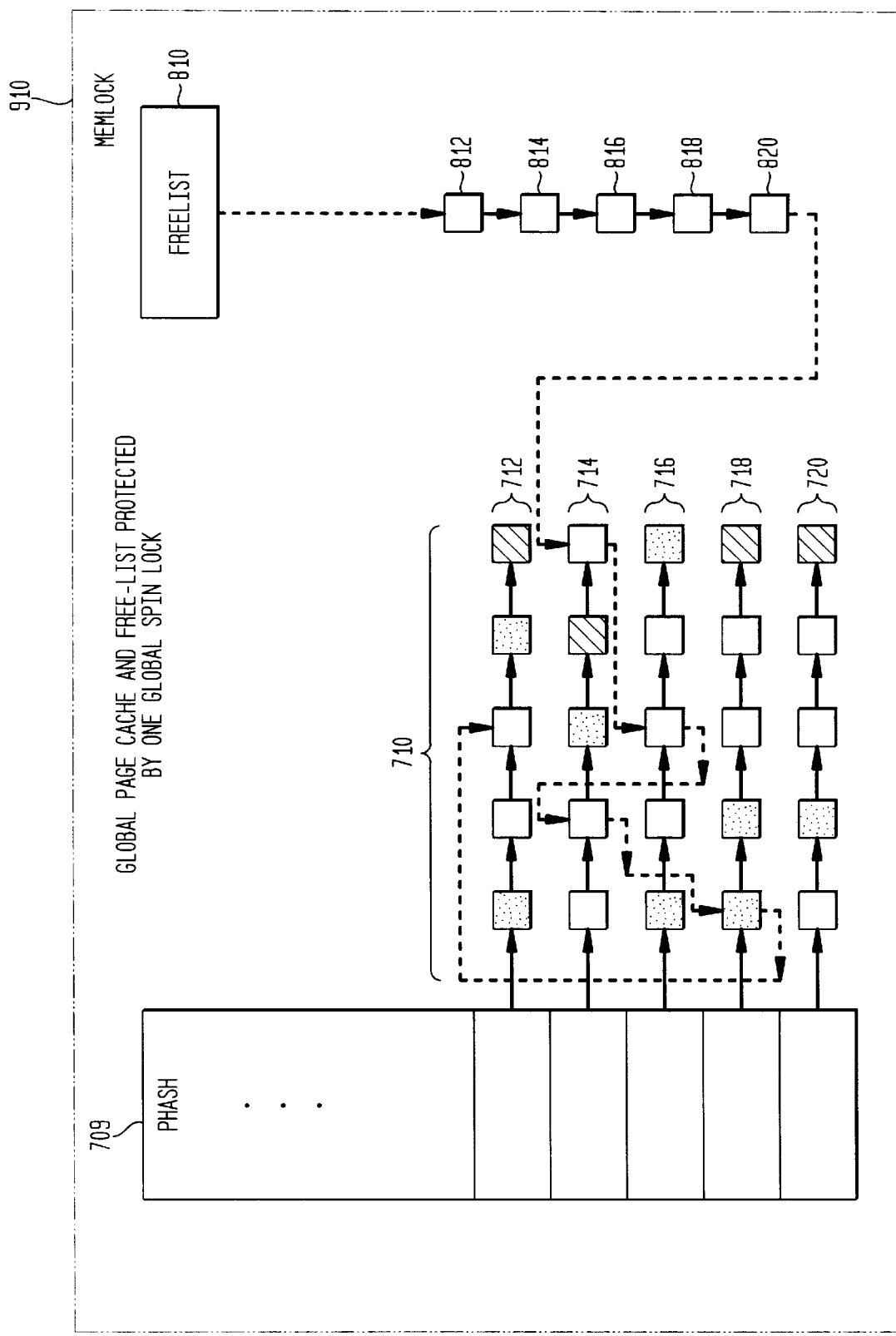
FIG. 9 is a block diagram of a conventional global memory lock that can be used to protect a global page cache during global page cache operations.

For example, referring to FIG. 9, a global memory lock 910 is acquired during a search of PFDATs 710 to preserve the integrity of the page cache data structure. Global memory lock 910 also protects free list data structure 810 and PHASH data structure 709. At the end of a page cache operation, global memory lock 910 is released.

D. Global Page Caches Do Not Scale

Figure 10:
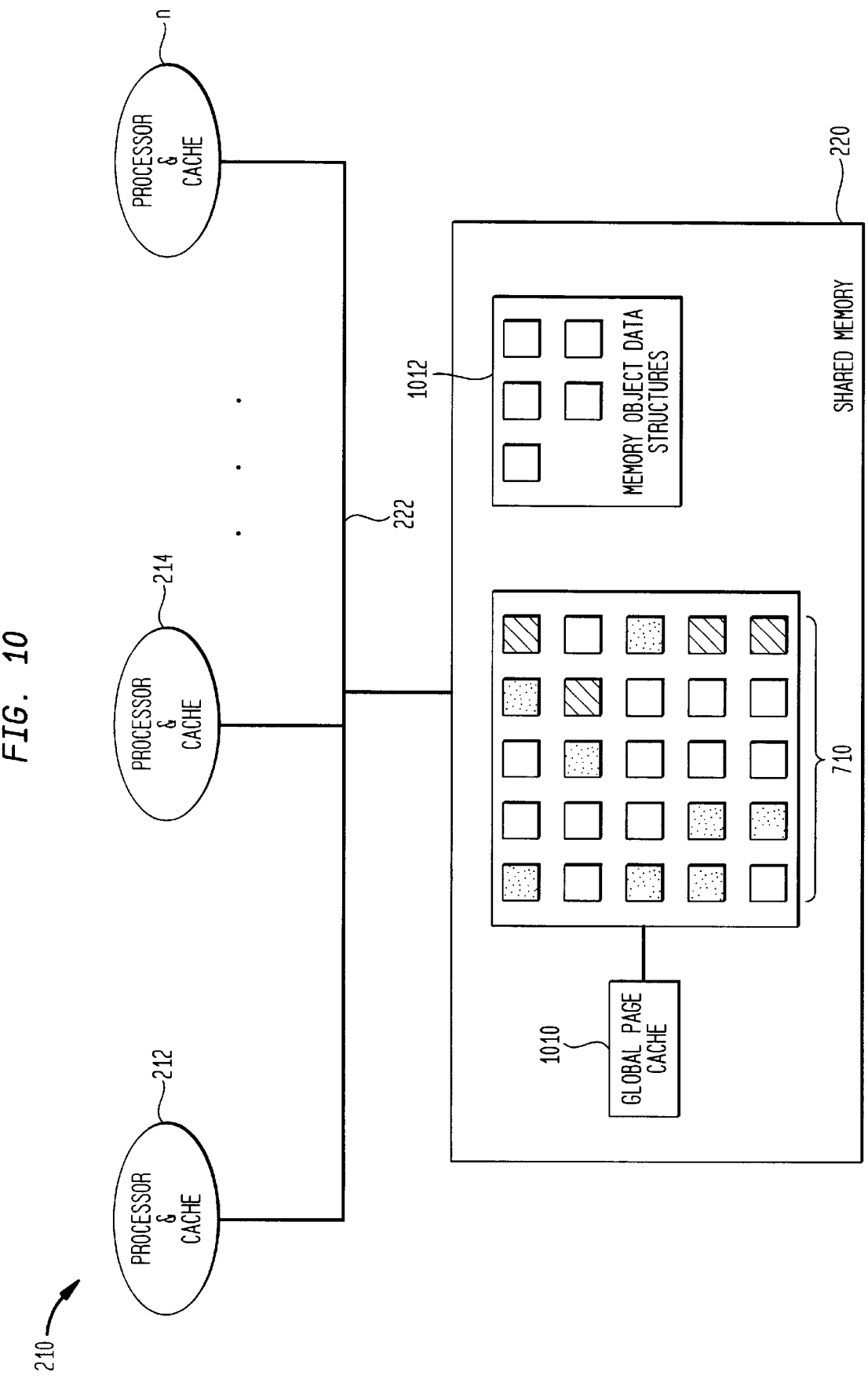
FIG. 10 is a block diagram of a portion of the SMP system illustrated in FIG. 2, including a conventional global page cache.

Referring to FIG. 10, portions of SMP system 210 are reproduced with a global page cache data object 1010 for caching PFDATs 710 stored in centralized shared memory 220. Shared memory 220 also includes one or more memory object data structures 1012 for representing memory objects. Each memory object data structure 1012 is associated with a separate memory object.

Processes that are running on processor and cache nodes 212-$n$ can perform page cache operations on page cache 1010 by invoking a mutual exclusion mechanism (not shown) that protects page cache 1010. Where SMP system 210 employs only a few processor and cache nodes 212-$n$, contention for the mutual exclusion mechanism is minimal.

For example, when a process that is executing on node 212 wants to access a first page of a memory object, and if it is not known where or whether the first page of the memory object is stored in memory, the kernel, or operating system 226 introduces a search of page cache data structure 1010 for a PFDAT 1710 that corresponds to the memory object ID and logical offset of the first page. If found, the physical address of the first page of data can be determined from the PFDAT 710. The physical address can be used to access the portion of the memory object in memory.

During the first search, the mutual exclusion mechanism, which can be global memory lock 910, prevents page cache operations on page cache data structure 1010 by any other process or processes. If a second process is executing on node 214, for example, and wants to access a second page of a memory object, and if it is not known where or whether the second page of the memory object is stored in memory, the kernel, or operating system 226 must search page cache data structure 1010 for a PFDAT 710 that corresponds to the memory object ID and logical offset of the second page.

However, the mutual exclusion mechanism precludes a second page cache operation on page cache data structure 1010 while the first page cache operation is ongoing. Thus, the second search must wait until the first search completes, even if the second search is directed to a different memory object. The global page cache and the mutual locking mechanism thus require that page cache operations be performed serially, either according to the order requested or according to some priority scheme.

In an SMP system that employs only a few processors, contention for the a mutual exclusion mechanism is relatively low. With additional processors n, however, the number of requests for page cache operations can exceed the rate at which they can be efficiently processed. At some point, the number of requested page cache operations can increase the contention for the page cache, or contention for the page cache mutual exclusion mechanism, and increase page cache operation latency, to unacceptable levels. Thus, global page caching is not scalable beyond a small number of processors.

E. Global Page Caching in DSMs

Figure 11:
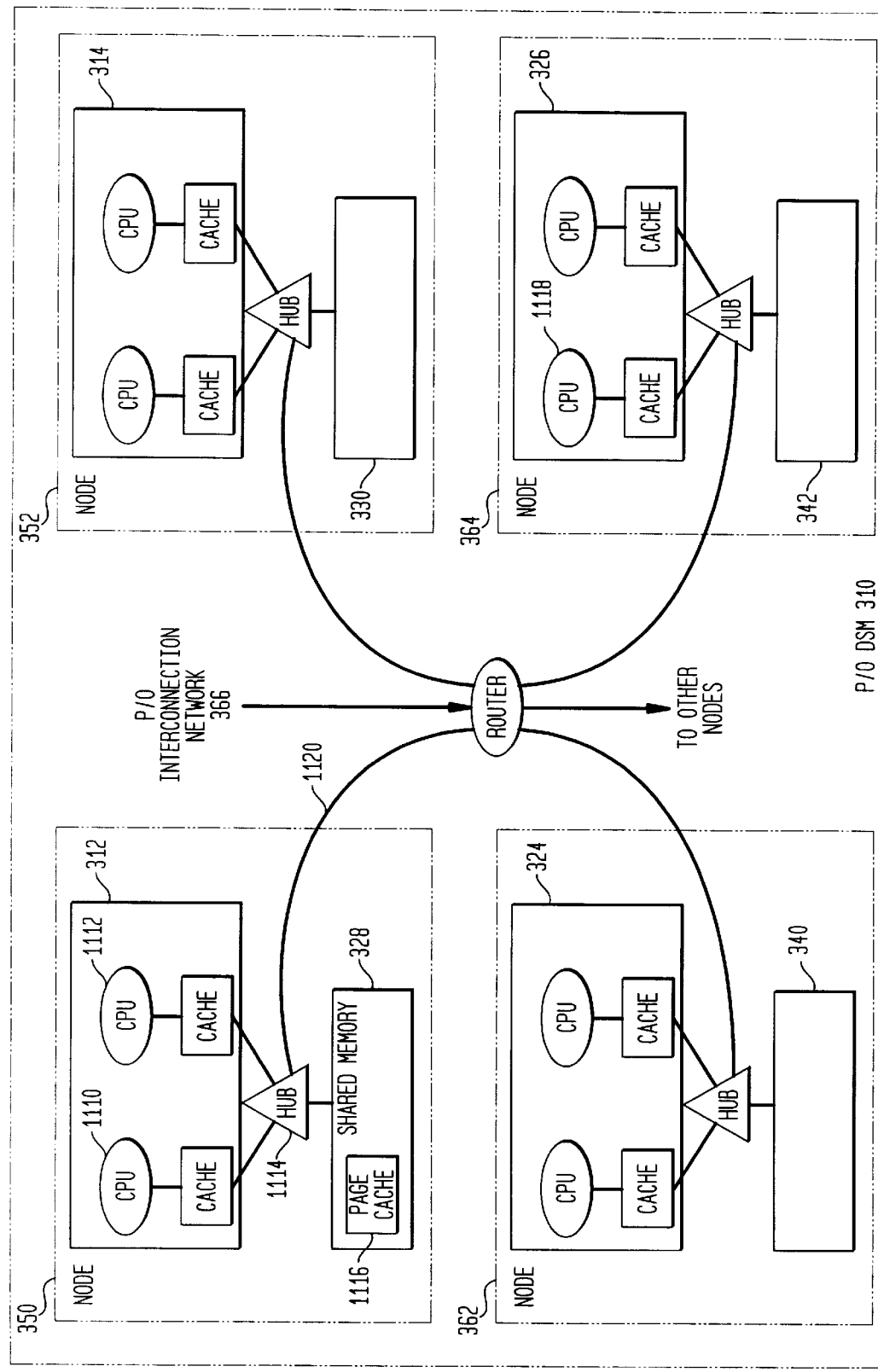
FIG. 11 is a block diagram of a portion of the DSM system illustrated in FIG. 3, including a conventional global page cache.

DSM system, such as DSM system 310, suffer from the global page cache and global memory lock problems discussed above and from several additional problems as well. Referring to FIG. 11, a portion of DSM 310 is reproduced, illustrating nodes 350, 352, 362 and 364. Nodes 350–364 can be configured identically or differently. Node 350 is illustrated here with two processors, or central processing units (CPUs), 1110 and 1112 each, coupled to main memory via a hub or interface 1114.

Operating system 368 generates data structures, such as PFDATs and memory object data structures. Operating system 368 also generates a global page cache 111 6, shown here as stored in memory portion 328. The contents of global page cache 1116 are dynamic and subject to change.

Various processors in DSM system 310 can execute processes which can request page cache operations. For example, processor 1118 on node 364 can execute a process that wants to access a page of a memory object that happens to reside in a page of physical memory within memory 342, which is also on node 364.

If processor 1118 does not know where, or whether, the page of the data object is stored in memory, processor 1118 must reference page cache 1116, in memory 328 of node 350 in order to identify PFDATs for searching. Thus, one of the advantages of distributing shared memory among processors in DSM system 310, namely, reducing memory access time, is diminished by having to first access a remote node because the page cache is in a remote node.

A second problem encountered in DSM systems such as DSM system 310 is referred to as "hot spots." From the above example, it can be understood that when processors in nodes 350–364 need to perform a page cache operation, they must first access global page cache 1116 on node 350. Thus, every page cache operation request from processors on nodes 350–364 must be sent to remote node 350, via line 1120.

As more processors are added to DSM system 310, more requests for page cache operations will communicate over line 1120. At some number of additional requests for page cache operations, the bandwidth of link 1120 and hub 1114 will be approached or exceeded, thus creating a bottleneck or hot spot in that portion of the system. Moreover, with increasing page cache operations on page cache 1116, processors 1110 and 1112 will find it increasingly difficult to access memory 328, or memory 330–342.

3. Distributed Page Caching

The present invention reduces page cache and lock contention by generating a separate page cache for each memory object. Instead of a single, global page cache, each memory object is allotted a separate, or distributed, page cache. Each separate page cache associates only the PFDATs which store pages of the associated memory object.

Figure 16:
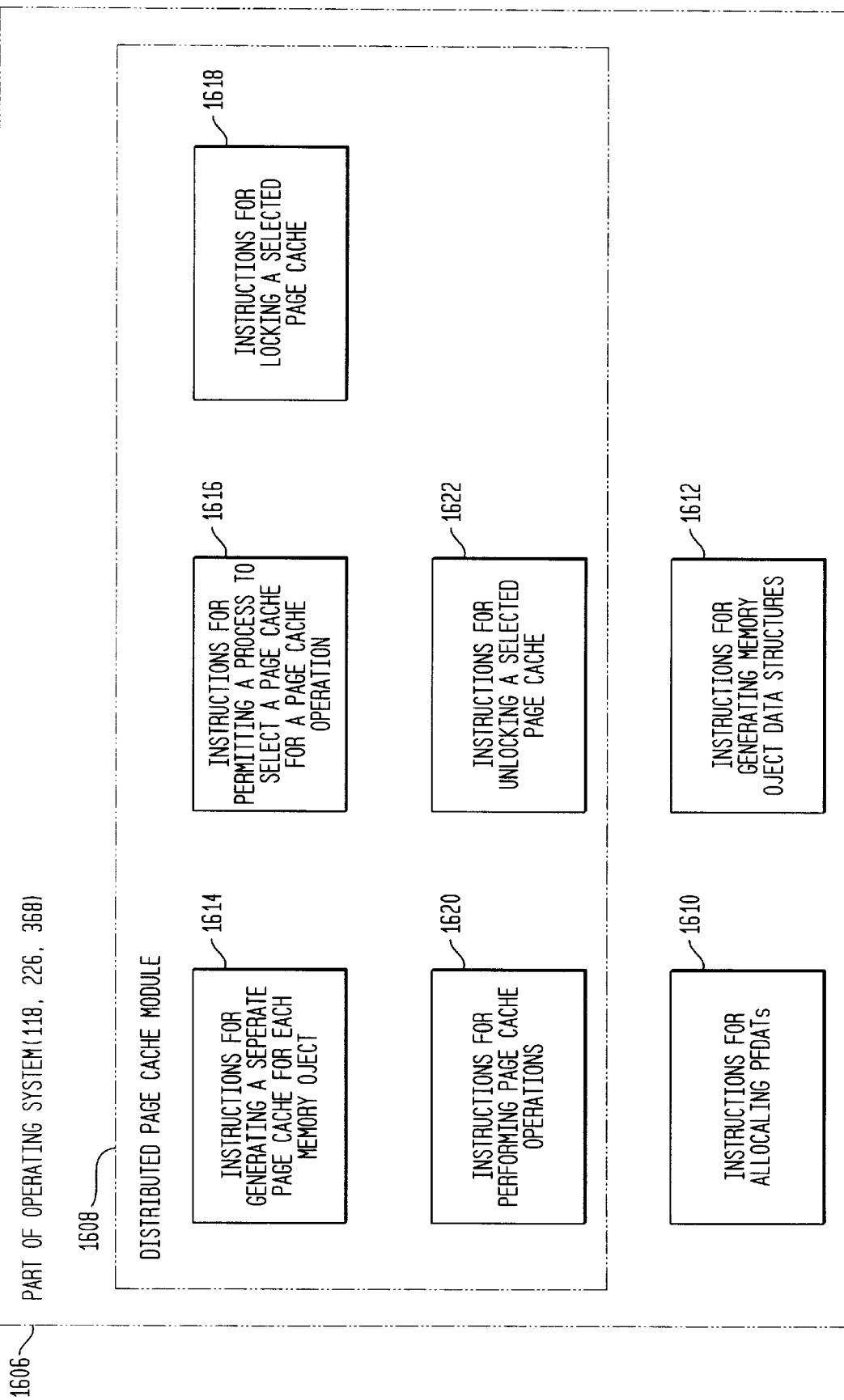
FIG. 16 is a process flowchart for generating and maintaining a separate page cache for each memory object data structure in a DSM system, according to the present invention.

The present invention can be implemented in software, firmware, hardware, or any combination thereof. For example, referring to FIG. 16, the present invention can be implemented as an integral part of operating system 1606 which can be operating systems 118, 226 and 368. Alternatively, the present invention can be implemented as a separate application that works in conjunction with operating system 1606. Operating system 1606 includes instructions 1610 for allocating PFDATs and instructions 1612 for generating memory object data structures. Operating system 1610 also includes a distributed page cache module 1608.

Distributed page cache module 1608 includes instructions 1614 for generating a separate page cache for each memory object, instructions 1616 for permitting a process to select a page cache for a page cache operation, instructions 1618 for invoking a mutual exclusion mechanism to protect the integrity of a page cache during a page cache operation, instructions 1620 for performing a variety of page cache operations on a selected page cache and instructions 1622 for unlocking a selected page cache after a page operation is complete.

One skilled in the art will recognized that instructions 1614–1622 can be arranged in a variety of groups or modules. Moreover, other instructions can be included as part of distributed page cache module 1608, such as instructions 1610 and 1612.

Figure 12:
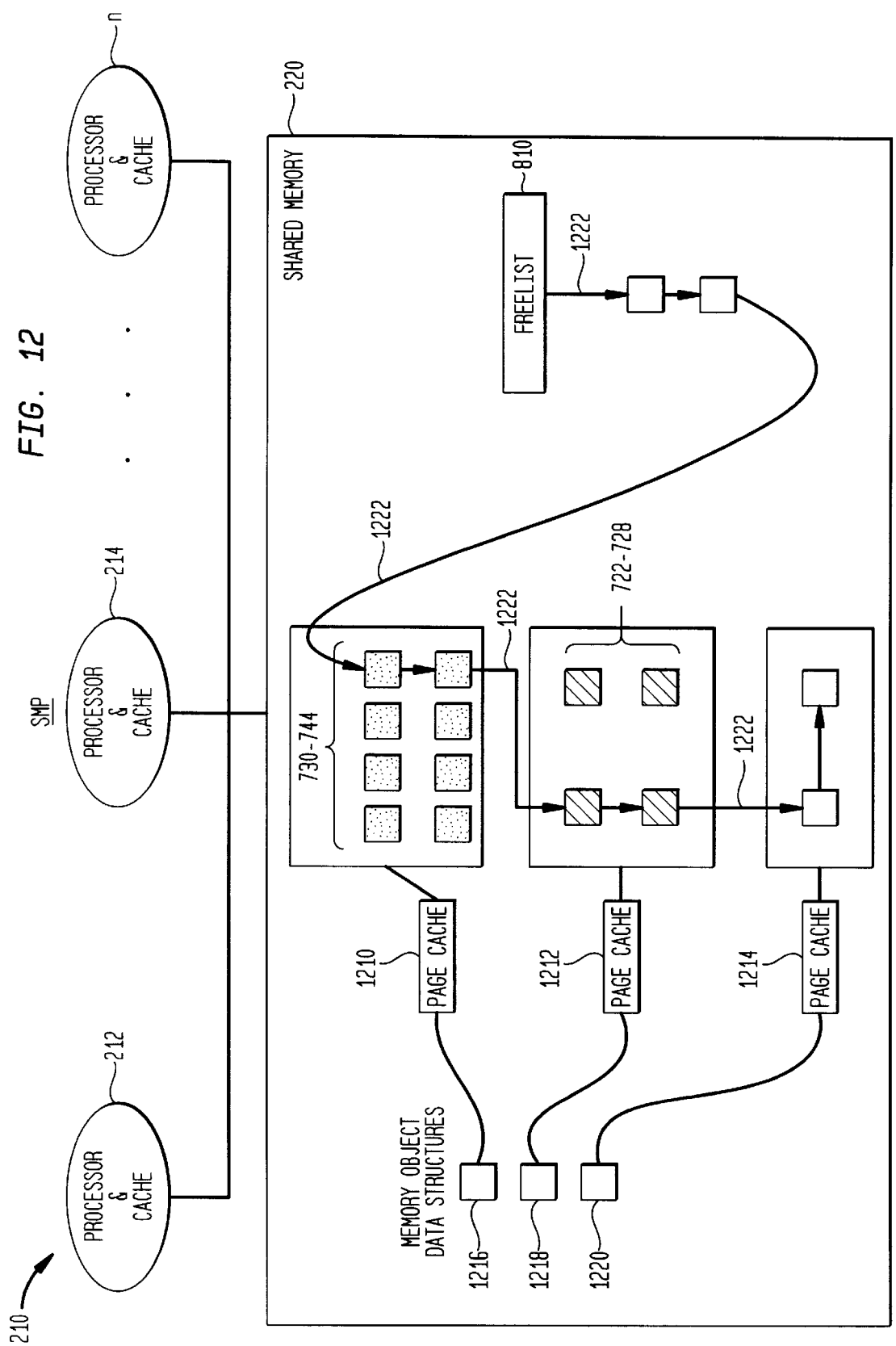
FIG. 12 is a block diagram of a portion of the SMP system of FIG. 2, including a separate page cache for each memory object data structure, according to the present invention.

The present invention can be implemented and used on a uni-processor system an SMP system, a DSM system, etc. For example, referring to FIG. 12, SMP system 210 is shown with a separate page cache, 1210–1214, for each of three memory object data structures 1216–1220, respectively. Each page cache 1210–1214 includes a local mutual exclusion mechanism, or lock, (not shown) for protecting the page cache during page cache operations. A global free-list 1222 of available physical memory pages is maintained by free list data structure 810.

Figure 13:
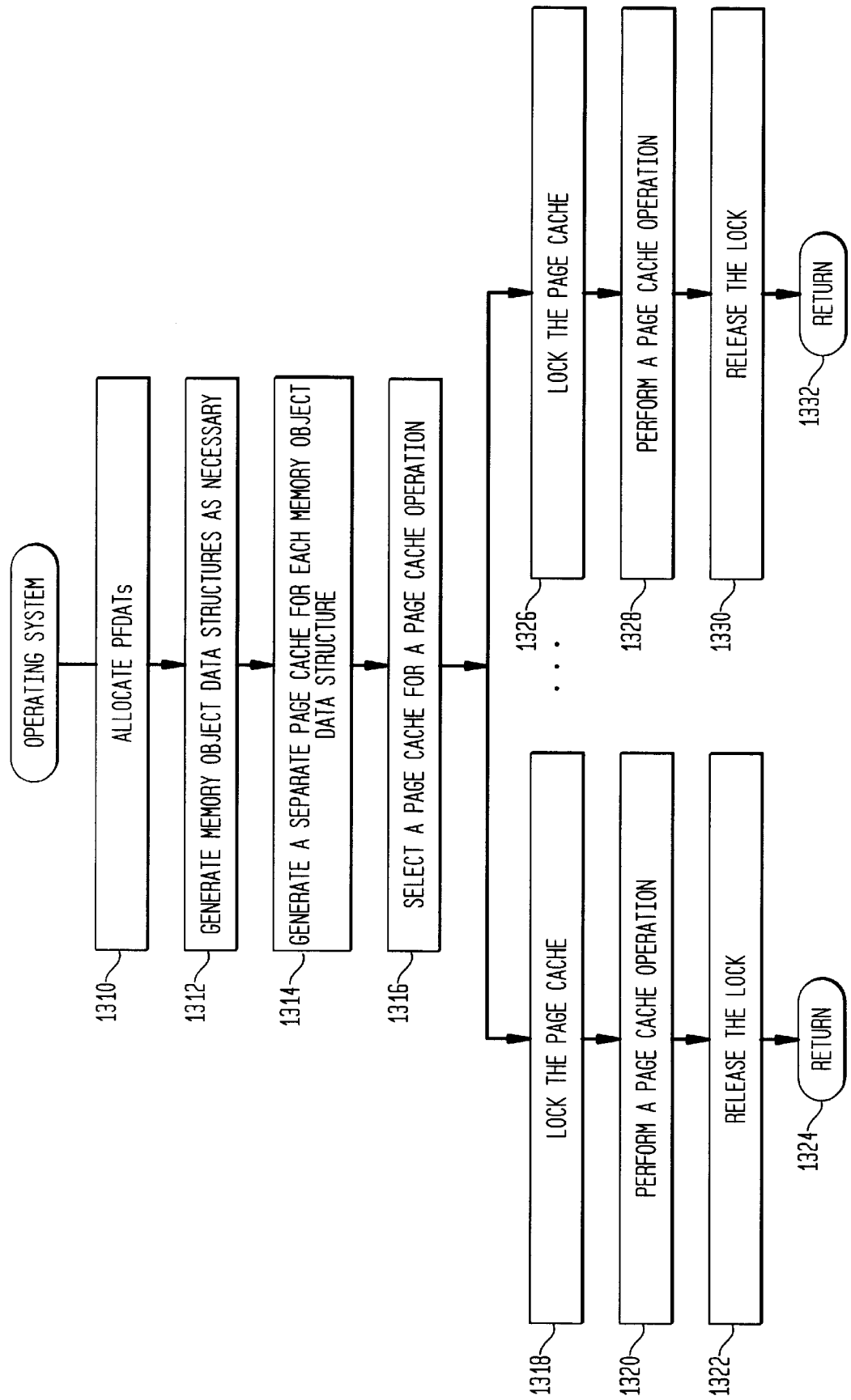
FIG. 13 is a process flowchart for generating and maintaining a separate page cache for each memory object data structure in a uni-processor system or a SMP system, according to the present invention.

Referring to the flow chart of FIG. 13, a preferred method for generating distributed page caches in an SMP system, such as SMP system 210, and for performing page cache operations thereon, is provided. The process begins at step 1310, where PFDATs are allocated by instructions 1610. PFDATs can be allocated statically for each page of memory at boot time or dynamically, as data is stored in pages of memory. PFDATs are stored in shared main memory 220.

In step 1312, instructions 1612 generate memory object data structures as needed. A memory object data structure is generated for a memory object when the memory object is opened or first referenced by a process. Thus, if a process on node 212 is the first process or processor to reference a memory object, a memory object data structure, such as data structure 1216, is generated in step 1312. Typically, a memory object data structure is generated before any portion of the memory object is placed in memory.

In step 1314, a separate page cache is generated by instructions 1614 for each memory object data structure that is generated in step 1312. For example, when memory object data structure 1216 is generated in step 1312, page cache 1210 is generated in step 1314. Similarly, when memory object data structures 1218 and 1220 are generated in step 1312, page caches 1212 and 1214 are generated, respectively, in step 1314.

Since each memory object data structure has a dedicated page cache, page cache operations can be performed for different memory objects in parallel. Thus, in step 1316, instructions 1616 permit processes to select one or more distributed page caches, such as page caches 1210–1214, for page cache operations. A page cache is selected based upon the memory object that is being used. For a first page cache selection, processing proceeds to step 1318.

In step 1318, a mutual exclusion mechanism, such as a page cache lock, is initiated by instructions 1618 for the selected page cache. The page cache lock protects the integrity of the page cache during page cache operations. For example, if page cache 1210 is selected for searching, the page cache lock for page cache 1210 prevents other processes from performing page cache operations on page cache 1210.

In step 1320, instructions 1620 are used to perform one or more page cache operations on the selected page cache. Alternatively, all, or a portion of page cache instructions 1620 can reside outside of distributed page cache module 1608. Page cache operations can include adding or deleting PFDATs to a page cache, deallocating a page cache, and determining a physical address for a page or pages of a memory object so that the page or pages can be accessed by a process or processor. Page cache operations can also include checking or updating state information for a PFDAT or for a range of PFDATs.

For example, if one or more pages of a memory object are placed into memory, the PFDATs that represent the memory must be cached in a page cache that was generated for the memory object in step 1314. Similarly, a memory object data structure can be de-allocated when, for example, there are no more requests for any portion of the memory object.

Page cache operations typically include a search of cached PFDATs for a PFDAT that contains a particular logical offset value or for a group of PFDATs that contain a range of logical offset values. Such a search can be performed by a hash table such as hash table 708. If the search discovers a PFDAT that stores the logical offset or a group of PFDATs that contain the range of logical offset values, then the state information in the PFDAT or PFDATs can be checked or updated. In addition, or alternatively, a physical address of the page that stores the data associated with the logical offset can be determined from each PFDAT so that the data can be accessed by a process or processor using the physical address.

In step 1322, after the page cache operation is complete, the mutual exclusion mechanism (e.g., or memory lock), that is associated with the selected page cache is released so that other page cache operations can be performed on the selected page cache.

Processing proceeds to step 1324 which returns processing to any of steps 1310–1316, depending upon the specific implementation employed. For example, if PFDATs are generated dynamically as needed rather than at boot-up, processing can return to step 1310 for generation of additional PFDATs. Alternatively, processing can be returned to step 1312 for generation of additional memory object data structures or to step 1316 for selection of a page cache for a page cache operation.

Steps 1318–1324 are reproduced as steps 1326–1332 to illustrate that page cache operations can be performed independently on different page caches in parallel. This approach is thus highly scalable because, no matter how many processing nodes are in SMP system 210, page caches 1210, 1212, 1214, etc., can be searched in parallel. As a result, page cache search time and lock contention are substantially reduced.

The present invention can be implemented in a uniprocessor system such as system 110 in a similar fashion. Operation of the present invention in a uni-processor system is substantially the same as described in steps 1310–1324. In a uni-processor system, where a multi-tasking operating system is employed, steps 1318–1324 can be performed independently, on different page caches in parallel for more than one task, as illustrated steps 1326–1332.

Figure 14:
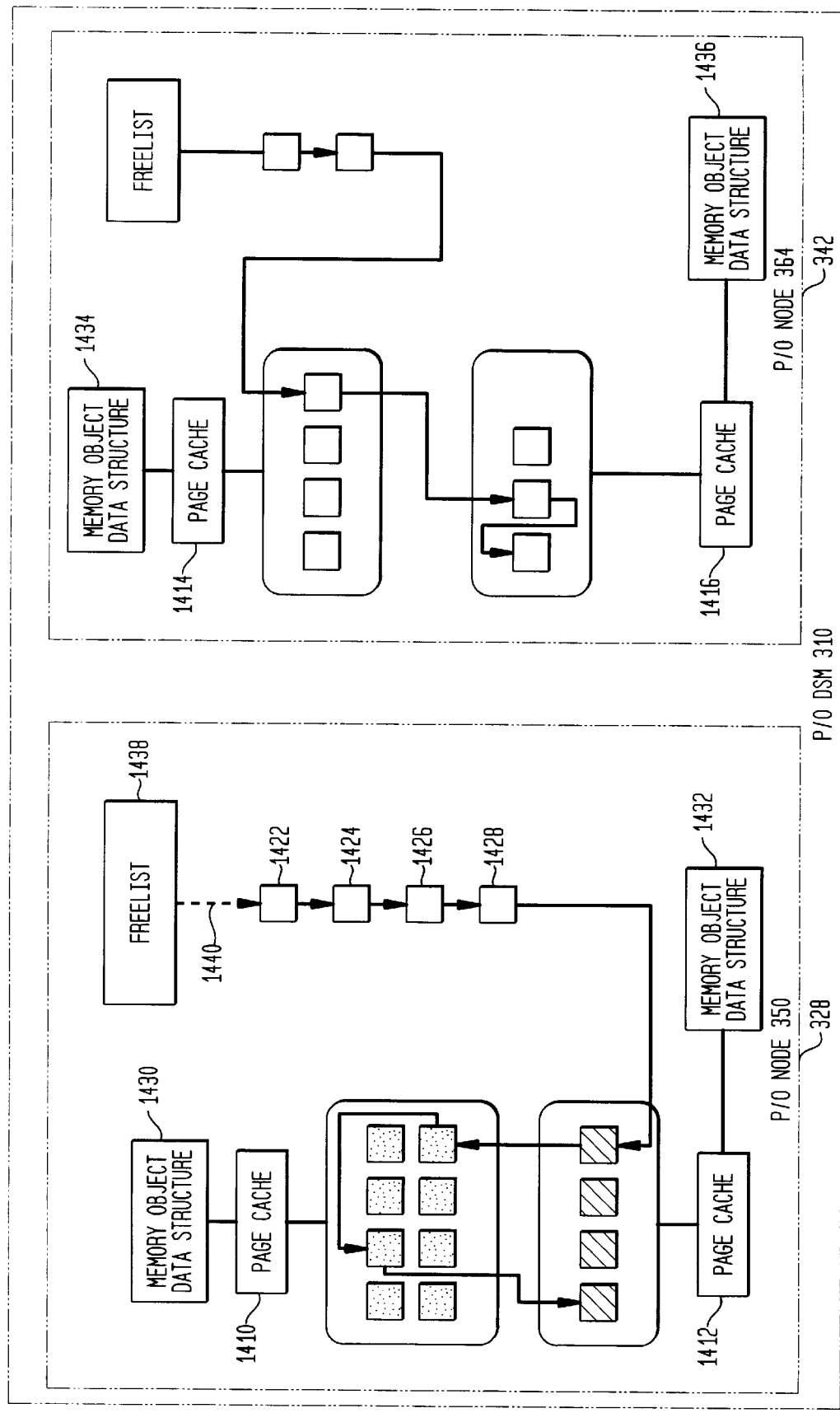
FIG. 14 is a block diagram of a portion of the DSM system illustrated in FIG. 3, including a separate page cache for each memory object data structure, according to the present invention.

Referring to FIG. 14, the present invention is shown implemented in an operating system, such as operating system 368 on DSM 310. In FIG. 14, physical or main memory portions 328 and 342 of DSM 310 are illustrated. Physical memory 328 includes two page cache data structures 1410 and 1412. Page cache 1410 contains eight PFDATs, which can be PFDATs 730–744, that represent eight pages of physical memory 328. The eight pages of physical memory each store a page of a first memory object The first memory object is represented by memory object data structure 1430. Page cache 1412 contains four PFDATs, which can be PFDATs 722–728, that represent four pages of physical memory 328. The four pages of physical memory store four pages of memory for a second memory object represented by memory object data structure 1432.

Similarly, shared physical memory 342 includes page caches 1414 and 1416, associated with data structures 1434 and 1436, respectively. Shared physical memory, such as shared physical memories 328 and 342 will typically include many more memory object data structure and page cache pairs.

Each portion of shared physical memory 328–342 can include a separate free-list. For example, in physical memory 328, free-list data structure 1438 maintains free-list 1440. Free-list 1440 associates unused PFDATs 1422–1428 and a number of PFDATs that are associated with page caches 1410 and 1412. Free-list PFDATs which are associated with page cache 1410 and page cache 1412 represent pages of physical memory which currently store data for the first or second memory object data structures but which are not currently in use and are thus available on the free-list. Alternatively, a single, global free-list (not shown) could be employed by DSM 310. One skilled in the art will recognize that there are a variety of ways to implement a free list. The techniques described herein are provided as examples, not to limit the present invention.

Operation of the present invention as implemented in an operating system of a DSM system is similar in many respects to operation of the present invention in an SMP system. Referring to FIG. 13, operation in a DSM begins at step 1310, where PFDATs are allocated by instructions 1610. PFDATs can be allocated statically for each page of memory at boot-up or dynamically, as data is stored in pages of memory. PFDATs can be stored in any portion of shared memory 328–342, but are preferably placed on the same node as the memory that they represent.

In step 1312, memory object data structures, such as data structures 1430, 1432, 1434 and 1436 are generated by instructions 1612 when a memory object is first referenced. Preferably, memory object data structures are placed in a portion of shared memory 328–342 that is adjacent to the referencing processor and cache node 312–326. For example, if a process that is running on processor and cache node 312 references a first memory object, a data structure, such as data structure 1430, for example, is generated to represent the first memory object and is placed in memory portion 328. When the memory object is no longer referenced by the process, or by any other process, the data structure that represents the memory object can be deallocated.

In step 1314, a separate page cache is generated by instructions 1614 for each memory object data structure that was generated in step 1312. Preferably, each page cache is placed in the same portion of shared memory 328–342 which stores the associated memory object data structure that was generated in step 1312. For example, when data structure 1430 is generated in step 1312 and placed in shared memory portion 328, page cache 1410 is generated in step 1314 and is preferably placed in shared memory portion 328. Similarly, page cache 1412 is generated for data structure 1432 and is placed in shared memory portion 328 and page caches 1414 and 1416 are generated for data structure 1434 and 1436, respectively and placed in shared memory portion 342. Additional data structures and associated page caches can be generated in steps 1312 and 1314 as needed.

Since each memory object has a separate page cache for caching PFDATs associated therewith, page cache operations can be performed on different page caches in parallel. For example, given a memory object identification and logical offset of a page of data, a page cache mapping and searching function, such as hash table 708, can identify a PFDAT that represents a page of physical memory (if any) which contains the data by simply searching the page cache associated with the memory object. At the same time, other page cache operations can be performed on other page caches. For example, PFDATs can be added or deleted from other page caches and state information can be updated for PFDATs in other page caches. Thus, in step 1316, one or more distributed page caches, such as page caches 1410, 1412, 1414 and 1416 can be selected for page cache operations.

In step 1318, a mutual exclusion mechanism, such as a page cache lock, is initiated by instructions 1618. A page cache lock protects the integrity of the page cache selected in step 1616.

In step 1320, a page cache operation is performed on the selected page cache by instructions 1620. Page cache operations can include any of the page cache operations that are described for SMPs and uni-processor systems. A page cache operation can include adding one or more PFDATs to a page cache.

For example, when a process that is running on processor and cache node 350 requests access to eight pages of a first memory object that is represented by, for example, data structure 1430, the eight requested pages are placed in memory. Preferably, the eight pages are placed in eight pages of shared memory 328 so that they are proximate to the requesting process. Alternatively, one or more of the eight pages of data can be placed in any other portion of memory, depending on memory availability, demands of other users, etc. The eight PFDATs that represent the eight pages of memory 328 are cached in page cache 1410 by instructions 1620.

In step 1322, when the page cache operation is complete, the mutual exclusion mechanism is released so that another process can perform a page cache operation on the page cache. Processing then proceeds to step 1324 where it is returned to a prior point, as described for SMPs and uni-processor systems above.

Steps 1310–1324 are reproduced as steps 1326–1332 to illustrate that page cache operations can be performed on different page caches, such as page caches 1410, 1412, 1414 and 1416, in parallel. This approach is thus highly scalable because, no matter how many different memory objects have pages stored in memory, page cache operations can be performed independently for each memory object. As a result, lock latency and contention for page cache data structures are substantially reduced.

Figure 15:
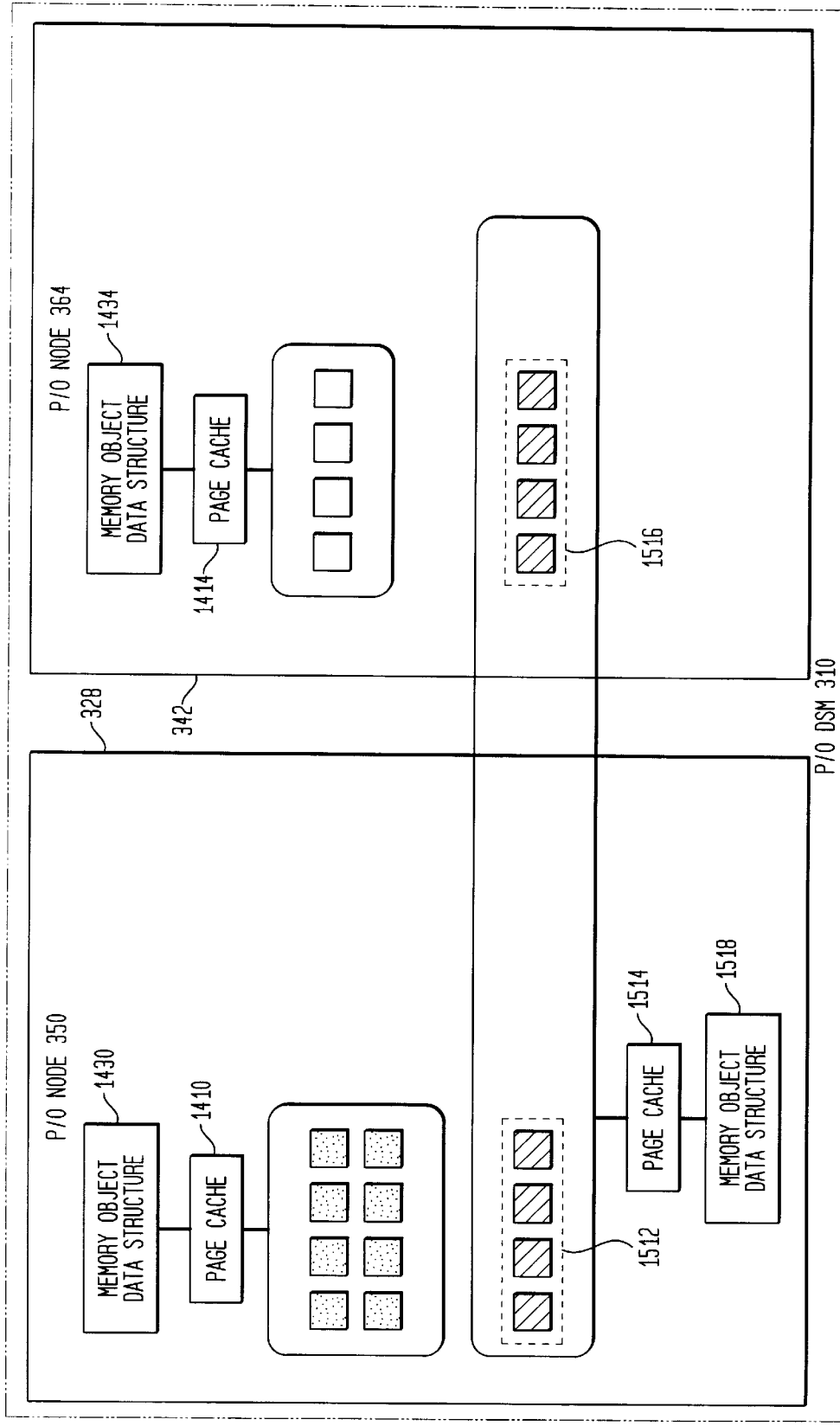
FIG. 15 is a block diagram of a portion of the DSM system illustrated in FIG. 3 including a separate page cache that caches page frame data structures across multiple nodes of physical memory, according to the present invention.

In a DSM system, PFDATs can be placed in a single processing node or can be distributed throughout a number of processing nodes. In order to maximize the flexibility of DSMs, distributed page caches can cache PFDATs in different processor nodes. For example, referring to FIG. 15, portions of DSM 310 are reproduced, including page caches 1410 and 1414 and with an additional page cache 1514. Page cache 1514 is associated with a third memory object that is represented by memory object data structure 1518.

Page cache 1514 includes a first group of PFDATs 1512 on node 350 and a second group of PFDATs 1516 on node 364. PFDATs 1512 and PFDATs 1516 can represent pages of physical memory within shared memories 328 and 342, respectively. Alternatively, PFDATs 1512 and 1516 can represent pages of memory on any other node or nodes. The pages of shared memory that are represented by PFDAT groups 1512 and 1516 store pages of the memory object that is represented by data structure 1518.

Operating system 368 typically determines where to place page frame data structures, page frames, memory object data structures and page caches. Generally, locations of page frame data structures, memory object data structures and page cache data structures do not change during operation.

The present invention can be combined with systems that can move a page of memory object from one page frame to another. For example, the present invention can be employed by a system that coalesces pages of data in order to obtain a number of contiguous pages of free memory. The present invention can also be employed by a DSM system that employs page migration techniques, whereby a page of a memory object can be migrated, or moved, from one node to another node. Data can be migrated for a variety of reasons, such as, for example, to achieve better locality with processes that employ the memory object pages.

When a page of data is moved from a first page of memory to a second page of memory, instructions 1620 are invoked to update any page caches that cache a first page frame data object that represents the first page of memory. More specifically, if a page cache caches the first page frame data object, the first page frame data object is deleted from the page cache. In addition, a second page frame data object that represents the second page of memory is added to the page cache.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for caching page frame data objects in a computer system, the computer system comprising a plurality of pages of memory for storing pages of memory objects and an operating system for generating a page frame data structure for each page of physical memory and for generating a memory object data structure for each memory object, wherein the operating system employs the page frame data structures for representing the pages of physical memory and wherein the operating system employs the memory object data structures for representing the memory objects, the method comprising the step of:

(1) generating page frame data structures to represent pages of memory;

(2) storing a portion of a first memory object in a first set of pages of memory (3) generating a first memory object data structure to represent the first memory object;

(4) organizing page frame data structures that represent the first set of pages of memory in a first page cache;

(5) storing a portion of a second memory object in a second set of pages of memory;

(6) generating a second memory object data structure to represent the second memory object; and (7) organizing page frame data structures that represent the second set of pages of memory in a second page cache.

2. The method according to claim 1, further comprising the step of:

(8) performing a page cache operation on one of the first and second page caches.

3. The method according to claim 2, wherein step (8) comprises the step of:

(a) protecting the integrity of the one of the first and second page caches during the page cache operation.

4. The method according to claim 2, wherein step (8) comprises the step of:

(a) searching the page frame data structures in the one of the first and second page caches for a page frame data structure that stores a particular logical offset value.

5. The method according to claim 4, wherein step (8) further comprises the step of:

(b) checking state information that is stored in the page frame data structure that stores the particular logical offset value.

6. The method according to claim 4, wherein step (8) further comprises the step of:

(b) updating state information that is stored in the page frame data structure that stores the particular logical offset value.

7. The method according to claim 4, wherein step (8) further comprises the step of:

(b) determining a physical address of a page frame that is represented by the page frame data structure that stores the particular logical offset value.

8. The method according to claim 7, wherein step (8) further comprises the step of:

(c) accessing the page frame using the physical address determined from the page frame data structure that stores the particular logical offset value.

9. The method according to claim 2, wherein step (8) comprises the step of:

(a) adding a first page frame data structure to the page cache when a page of the memory object is placed in a page of memory that is represented by the first page frame data structure.

10. The method according to claim 2, wherein step (8) comprises the step of:

(a) removing a first page frame data structure from the page cache when a page of the memory object is removed from the page of memory that is represented by the first page frame data structure.

11. The method according to claim 2, wherein step (8) comprises the steps of:

(a) deleting a first page frame data structure that represents a first page frame from the first page cache when a page of data of the first memory object is moved from the first page frame to a second page frame; and (b) adding a second page frame data structure that represents the second page frame to the first page cache when the page of data of the first memory object is moved from the first page frame to the second page frame.

12. The method according to claim 1, further comprising the step of:

(8) storing the first page cache and the first memory object data structure proximate to one another, in a distributed shared memory system.

13. The method according to claim 1, further comprising the step of:

(8) storing the first page cache proximate to a processor that first references the first memory object, in a distributed shared memory system.

14. The method according to claim 1, further comprising the step of:

(8) storing the first memory object data structure proximate to a processor that first references the first memory object, in a distributed shared memory system.

15. The method according to claim 1, wherein step (4) comprises the step of:

(a) organizing page frame data structures that represent the first set of pages of memory in a first page cache using a data structure.

16. The method according to claim 1, wherein step (4) comprises the step of:

(a) organizing page frame data structures that represent the first set of pages of memory in a first page cache using a hash table data structure.

17. A method for caching page frame data objects in a computer system, the computer system comprising a plurality of pages of memory for storing pages of memory objects and an operating system for generating a page frame data structure for each page of physical memory and for generating a memory object data structure for each memory object, wherein the operating system employs the page frame data structures for representing the pages of physical memory and wherein the operating system employs the memory object data structures for representing the memory objects, the method comprising the steps of:

(1) organizing page frame data structures that represent pages of memory that store pages of a first memory object in a first page cache;

(2) organizing page frame data structures that represent pages of memory that store pages of a second memory object in a second page cache;

(3) selecting the first page cache for a first page cache operation; and (4) performing the first page cache operation on the first page cache.

18. The method according to claim 17, wherein step (4) comprises the step of:

(a) protecting the integrity of the first page cache during the first page cache operation.

19. The method according to claim 17, further comprising the step of:

(5) selecting the second page cache for a second page cache operation; and (6) performing the second page cache operation on the second page cache.

20. The method according to claim 19, wherein step (6) comprises the step of:

(a) performing the second page cache operation on the second page cache while the first page cache operation is being performed on the first page cache.

21. The method according to claim 20, further comprising the steps of:

(7) protecting the integrity of the first page cache during the first page cache operation; and (8) protecting the integrity of the second page cache during the second page cache operation.

22. The method according to claim 17, wherein step (4) comprises the step of:

(a) searching the page frame data structures in the first page cache for a page frame data structure that stores a particular logical offset value.

23. The method according to claim 22, wherein step (4) further comprises the step of:

(b) checking state information that is stored in the page frame data structure that stores the particular logical offset value.

24. The method according to claim 22, wherein step (4) further comprises the step of:

(b) updating state information that is stored in the page frame data structure that stores the particular logical offset value.

25. The method according to claim 22, wherein step (4) further comprises the step of:

(b) determining a physical address of a page frame that is represented by the page frame data structure that stores the particular logical offset value.

26. The method according to claim 25, wherein step (4) further comprises the step of:
(c) accessing the page frame using the physical address determined from the page frame data structure that stores the particular logical offset value.

27. The method according to claim 17, wherein step (4) comprises the step of:
(a) adding a first page frame data structure to the page cache when a page of the memory object is placed in a page of memory that is represented by the first page frame data structure.

28. The method according to claim 17, wherein step (4) comprises the step of:
(a) removing a first page frame data structure from the page cache when a page of the memory object is removed from the page of memory that is represented by the first page frame data structure.

29. The method according to claim 17, wherein step (4) comprises the steps of:
(a) deleting a first page frame data structure that represents a first page frame from the page cache when a page of data of the first memory object is moved from the first page frame to a second page frame; and
(b) adding a second page frame data structure that represents the second page frame to the page cache when the page of data of the first memory object is migrated from the first page frame to the second page frame.

30. A system for caching page frame data objects in a computer system, the computer system comprising a plurality of pages of memory for storing pages of memory objects and an operating system for generating a page frame data structure for each page of physical memory and for generating a memory object data structure for each memory object, wherein the operating system employs the page frame data structures for representing the pages of physical memory and wherein the operating system employs the memory object data structures for representing the memory objects, the system comprising:
a module that organizes page frame data structures that represent pages of memory that store pages of a first memory object in a first page cache;
a module that organizes page frame data structures that represent pages of memory that store pages of a second memory object in a second page cache;
a module that selects the first page cache for a first page cache operation; and
a module that performs the first page cache operation on the first page cache.

31. The system according to claim 30, further comprising:
a module that selects the second page cache for a second page cache operation; and
a module that performs the second page cache operation on the second page cache.

32. The system according to claim 31, wherein said module that performs the second page cache operation on the second page cache
performs the second page cache operation on the second page cache while the first page cache operation is being performed on the first page cache.

33. The system according to claim 32, further comprising:
a first mutual exclusion mechanism that protects the integrity of the first page cache during the first page cache operation; and
a second mutual exclusion mechanism that protects the integrity of the second page cache during the second page cache operation.

34. The system according to claim 30, further comprising:
a module that deletes a first page frame data structure that represents a first page frame from the page cache, when a page of data of the first memory object is moved from the first page frame to a second page frame; and
a module that adds a second page frame data structure that represents the second page frame to the page caches when the page of data of the first memory object is moved from the first page frame to the second page frame.

35. The system according to claim 30, further comprising:
a module that stores the first page cache, and a first memory object data structure that represents the first memory object, proximate to one another in a portion of memory in a distributed shared memory system.

36. The system according to claim 30, further comprising:
a module that stores the first page cache in a portion of memory in a distributed shared memory system that is proximate to a processor that first references the first memory object.

37. The system according to claim 30, further comprising:
a module that stores a first memory object data structure that represents the first memory object in a portion of memory in a distributed shared memory system that is proximate to a processor that first references the first memory object.

38. A computer program product comprising a computer useable medium having computer program logic stored therein, said computer program logic for enabling a computer to generate a separate page of page frame data structures for each memory object, wherein said computer program logic comprises:
a procedure that enables the computer to organize page frame data structures that represent pages of memory that store pages of a first memory object in a first page cache;
a procedure that enables the computer to organize page frame data structures that represent pages of memory that store pages of a second memory object in a second page cache;
a procedure that enables the computer to select the first page cache for a first page cache operation; and
a procedure that enables the computer to perform the first page cache operation on the first page cache.

39. The computer program product according to claim 38, further comprising:
a procedure that enables the computer to select the second page cache for a second page cache operation; and
a procedure that enables the computer to perform the second page cache operation on the second page cache.

40. The computer program product method according to claim 39, wherein said procedure that enables the computer to perform the second page cache operation on the second page cache
enables the computer to perform the second page cache operation on the second page cache while the first page cache operation is being performed on the first page cache.

41. The computer program product according to claim 40, further comprising:
a procedure that enables the computer to protect the integrity of the first page cache during the first page cache operation with a first mutual exclusion mechanism; and
a procedure that enables the computer to protect the integrity of the second page cache during the second page cache operation with a second mutual exclusion mechanism.

42. The computer program product according to claim 38, further comprising:

a procedure that enables the computer to delete a first page frame data structure that represents a first page frame from the page caches when a page of data of the first memory object is migrated from the first page frame to a second page frame; and a procedure that enables the computer to add a second page frame data structure that represents the second page frame to the page cache, when the page of data of the first memory object is migrated from the first page frame to the second page frame.

43. The computer program product according to claim 38, further comprising:

a procedure that enables the computer to store the first page cache and a first memory object data structure that represents the first memory object, proximate to one another in a portion of memory in a distributed shared memory system.

44. The computer program product according to claim 38, further comprising:

a procedure that enables the computer to store the first page cache in a portion of memory in a distributed shared memory system that is proximate to a processor that first references the first memory object.

45. The computer program product according to claim 38, further comprising:

a procedure that enables the computer to store a first memory object data structure that represents the first memory object in a portion of memory in a distributed shared memory system that is proximate to a processor that first references the first memory object.

* * * * *